(12) United States Patent
Yu et al.

(10) Patent No.: US 11,464,160 B2
(45) Date of Patent: Oct. 11, 2022

(54) LAWN MOWER ROBOT AND METHOD FOR CONTROLLING THE SAME

(71) Applicant: LG ELECTRONICS INC., Seoul (KR)

(72) Inventors: Kyungman Yu, Seoul (KR); Hyunsup Song, Seoul (KR); Hungkook Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 363 days.

(21) Appl. No.: 16/734,942

(22) Filed: Jan. 6, 2020

(65) Prior Publication Data
US 2021/0000009 A1    Jan. 7, 2021

(30) Foreign Application Priority Data

Jul. 5, 2019 (KR) .................. 10-2019-0081504

(51) Int. Cl.
*A01D 34/00* (2006.01)
*G05D 1/02* (2020.01)
*A01D 101/00* (2006.01)

(52) U.S. Cl.
CPC ......... *A01D 34/008* (2013.01); *G05D 1/0272* (2013.01); *A01D 2101/00* (2013.01); *G05D 2201/0208* (2013.01)

(58) Field of Classification Search
None
See application file for complete search history.

(56) References Cited

U.S. PATENT DOCUMENTS

2011/0202224 A1* 8/2011 Thompson ........... G05D 1/0295
701/26
2011/0301757 A1* 12/2011 Jones .................... B60L 50/66
700/258
(Continued)

FOREIGN PATENT DOCUMENTS

JP        2018099041       6/2018
KR  10-2009-0074410 A     7/2009
(Continued)

OTHER PUBLICATIONS

International Search Report dated Apr. 2, 2020.
Office Action dated Feb. 16, 2021 issued in KR Patent Application No. 10-2019-0081504.

*Primary Examiner* — Jeff A Burke
*Assistant Examiner* — Arslan Azhar
(74) *Attorney, Agent, or Firm* — Birch, Stewart, Kolasch & Birch, LLP

(57) ABSTRACT

A lawn mower robot may include a plurality of distance sensor units. Each distance sensor unit detects distance information between the lawn mower robot and a fence for partitioning a region. A controller calculates adjacent direction information using each detected distance information. In addition, the lawn mower robot includes a position sensor module. The position sensor module detects position information related to the lawn mower robot. The controller detects whether the lawn mower has deviated from a preset region by using the position information. When the lawn mower robot has deviated, the lawn mower robot can be moved in a direction according to the calculated adjacent direction information and return along the shortest path.

11 Claims, 13 Drawing Sheets

(56) References Cited

U.S. PATENT DOCUMENTS

| | | | |
|---|---|---|---|
| 2014/0012418 A1 | 1/2014 | Johnson et al. | |
| 2014/0324269 A1 | 10/2014 | Abramson et al. | |
| 2015/0077045 A1* | 3/2015 | Harris | B60L 15/2036 |
| | | | 320/108 |
| 2016/0113195 A1* | 4/2016 | Das | G05D 1/0225 |
| | | | 701/25 |
| 2016/0227704 A1* | 8/2016 | Yamamura | G05D 1/0265 |
| 2017/0322559 A1 | 11/2017 | Fukuda et al. | |
| 2018/0299894 A1 | 10/2018 | Takase et al. | |

FOREIGN PATENT DOCUMENTS

| | | | |
|---|---|---|---|
| KR | 10-2011-0063346 A | 6/2011 | |
| KR | 10-2016-0128123 | 11/2016 | |
| KR | 10-1918994 | 2/2019 | |
| KR | 10-2019-0064252 A | 6/2019 | |
| KR | 10-2017 7015874 | 9/2019 | |
| WO | WO-2016052068 A1 * | 4/2016 | G01C 21/28 |

\* cited by examiner

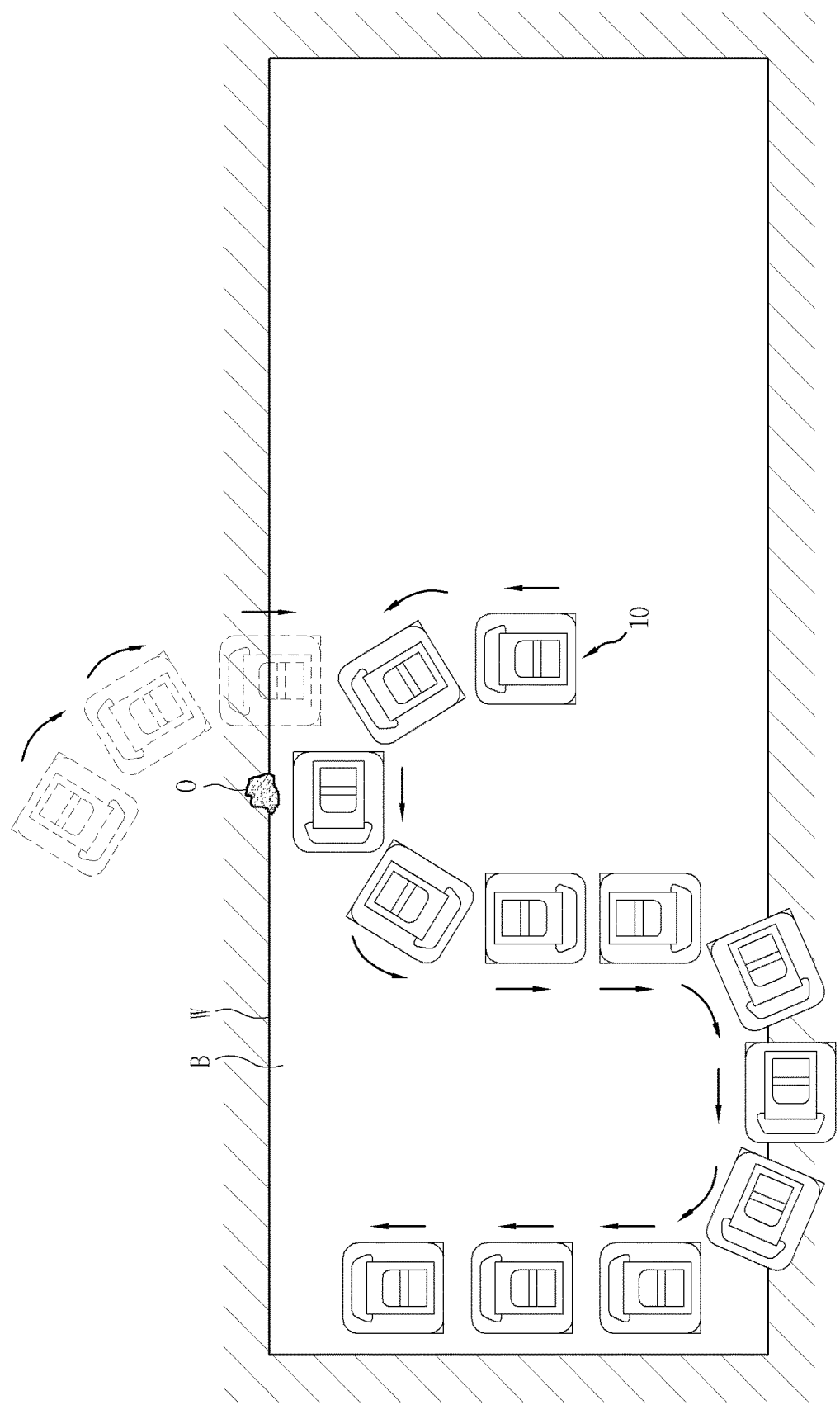

LAWN MOWER ROBOT AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2019-0081504, filed on Jul. 5, 2019, the contents of which is incorporated by reference herein in its entirety.

BACKGROUND

Field

This application relates to a lawn mower robot and a method for controlling the same, and one particular implementation relates to a lawn mower robot, which can be located in a preset region even when an obstacle is present on a boundary of the preset region, and a method for controlling the same.

Background

A lawn mower robot is a machine for mowing grass or lawn by moving itself according to preset control information. A user may input in advance control information related to desired mowing motion, time, and period. The lawn mower robot operates according to the input control information.

An environment in which a lawn mower robot is used may be a space having a large area, such as a meadow or a garden. Therefore, the lawn mower robot generally moves along a preset path in order to mow the lawn, etc. distributed in a large area.

In addition, the lawn mower robot divides the space into several small spaces and then moves along a preset path in each small space. By this division, the lawn mower robot can move closely in a large space. In other words, the lawn mower robot can pass through all the spaces without missing any space.

The division may be performed as a user inputs a control signal after setting a virtual space. Alternatively, the division may be performed by a physical method using a fence or the like.

On the other hand, considering that an environment using a lawn mower robot is an outdoor space, unexpected situations may occur. One example may be presence of an obstacle that may affect the travel of the lawn mower robot. When such obstacle is located in a divided small space, the lawn mower robot may return according to a preset control signal.

However, a situation may arise where the obstacle is located adjacent to a boundary that partitions the small space. In this case, the lawn mower robot may be deviated from a small space, in which it is performing a task, due to collision with the obstacle, and then enter another small space.

A control signal input to a lawn mower robot is generally generated to lead the lawn mower robot to enter another small space after completing a lawn mowing operation in a specific small space. That is, if the control signal for such a situation is not input in advance, the lawn mower robot cannot operate properly.

In addition, a lawn mower robot may enter another small space without completing a lawn mowing operation for a small space in which the operation is being performed. As a result, a case where a lawn mowing operation for an entire space is terminated without completing a lawn mowing operation in an original small space.

In such a case, the lawn mowing operation may not be performed effectively, and also a negative effect may be caused in user's satisfaction.

Korean Registration Patent Application No. 10-1918994 discloses a lawn mower robot. Specifically, the patent document discloses a lawn mower robot, which can detect descending of caster located on a bottom surface of an inner body by a sensor part provided for detecting lifting of the caster.

The lawn mower robot of the structure can detect the lifting of the component. However, there is a limitation in that the lawn mower robot does not provide a countermeasure for a case of deviating from a region in which the robot is moving.

Korean Laid-Open Publication Patent Application No. 10-2016-0128123 discloses a moving robot and a control method thereof. More specifically, the patent document discloses a moving robot having a structure capable of improving work efficiency for a work region by dividing the work region into a plurality of small regions, and a control method thereof.

However, the moving robot of the structure has considered about the method of dividing the work region, but fails to suggest a solution for a case where the robot leaves a region in which the robot is performing a work.

DESCRIPTION OF RELATED ART

Related Art Documents

Patent Documents

Korean Registration Patent Application No. 10-1918994 (Feb. 8, 2019)

Korean Laid-Open Publication Patent Application No. 10-2016-0128123 (Nov. 7, 2016)

SUMMARY

The present disclosure provides a lawn mower robot having a structure capable of solving those drawbacks, and a method for controlling the same.

One aspect of the present disclosure is to provide a lawn mower robot having a structure, capable of returning to an original position without a user's separate manipulation when colliding with an obstacle during an operation, and a method for controlling the same.

Another aspect of the present disclosure is to provide a lawn mower robot having a structure, capable of returning to an original region through a shortest path when it is deviated from (forcedly left or moved out of) a region where it was working due to collision with an obstacle, and a method for controlling the same.

Still another aspect of the present disclosure is to provide a lawn mower robot having a structure, capable of returning to a pre-recognized region when colliding with an obstacle during working, and a method for controlling the same.

Still another aspect of the present disclosure is to provide a lawn mower robot having a structure, capable of minimizing an area of a skip region (skip place, skip space) which is left without being mowed (processed, treated, managed, maintained) when a work is restarted after collision with an obstacle, and a method for controlling the same.

Still another aspect of the present disclosure is to provide a lawn mower robot having a structure, capable of continuously performing a task which was being originally performed, after collision with an obstacle, and a method for controlling the same.

Still another aspect of the present disclosure is to provide a lawn mower robot having a structure, capable of improving reliability of a task which the lawn mower robot is performing.

In order to achieve the above aspects according to the present disclosure, there is provided a lawn mower robot, including a body part, a plurality of main wheels rotatably connected to the body part, a power module provided in plurality connected to the main wheels, respectively, and configured to be rotated according to driving information so as to rotate the main wheels, a controller configured to calculate the driving information and electrically connected to the power module to transfer the calculated driving information to the power module, and a sensor part configured to detect spaced distance information from a wire disposed to surround a preset region, and electrically connected to the controller to transfer the detected spaced distance information to the controller. The controller may calculate the driving information using the spaced distance information detected by the sensor part.

The spaced distance information calculated by the controller of the lawn mower robot may include first spaced distance information in a preset first direction, and second spaced distance information in a preset second direction opposite to the first direction. The sensor part may include a first distance sensor unit configured to detect the first spaced distance information, and a second distance sensor unit configured to detect the second spaced distance information.

The spaced distance information calculated by the controller of the lawn mower robot may also include third spaced distance information in a preset third direction between the first direction and the second direction, and the sensor part may include a third distance sensor unit configured to detect the third spaced distance information.

The controller of the lawn mower robot may be configured to calculate adjacent direction information related to a more adjacent direction of the first direction and the second direction, using a difference between the first spaced distance information and the second spaced distance information.

The controller of the lawn mower robot may be configured to calculate deviation information related to a percentage of a volume of the body part deviated from the preset region, and calculate the adjacent direction information when the calculated deviation information exceeds a preset percentage value.

The power module of the lawn mower robot may be configured to be rotated in one of a preset first rotational direction and a preset second rotational direction opposite to the first rotational direction. When the calculated deviation information exceeds the preset percentage value, the controller may be configured to calculate the driving information for rotating the power module in a direction, opposite to a rotational direction of the power module immediately before the calculated deviation information exceeds the preset percentage value, of the first rotational direction and the second rotational direction.

The main wheel of the lawn mower robot may include a first main wheel located at one side of the body part facing the first direction, and a second main wheel located at another side of the body part facing the second direction.

The power module may include a first power module connected to the first main wheel, and a second power module connected to the second main wheel. The controller may be configured to calculate steering information for controlling the power module such that a rotational speed of the second power module is faster than a rotational speed of the first power module when the calculated adjacent direction information is the first direction. On the other hand, the controller may be configured to calculate steering information for controlling the power module such that a rotational speed of the first power module is faster than a rotational speed of the second power module when the calculated adjacent direction information is the second direction.

In order to achieve the aspects according to the present disclosure, there is provided a method for controlling a lawn mower robot, the method including (a) detecting, by a distance sensor module, spaced distance information from a wire disposed to surround a preset region, (b) calculating, by an external information calculation module, adjacent direction information by using the detected spaced distance information, (c) calculating, by an operation information calculation module, operation information using the calculated adjacent direction information, and (d) controlling a power module according to the calculated operation information.

The step (a) in the method for controlling the lawn mower robot may include (a1) detecting, by a first distance sensor unit, first spaced distance information in a preset first direction, and (a2) detecting, by a second distance sensor unit, second spaced distance information in a preset second direction opposite to the first direction.

The step (b) in the method for controlling the lawn mower robot may include (b1) detecting, by a position sensor module, position information related to a body part of the lawn mower robot, (b2) calculating, by a deviation information calculation unit, deviation information related to a percentage of a volume of the body part deviated from the preset region, and (b3) calculating, by an adjacent direction information calculation unit, the adjacent direction information using a difference between the detected first spaced distance information and the detected second spaced distance information when the deviation information exceeds a preset percentage value.

The operation information in the method for controlling the lawn mower robot may include driving information for driving the power module. The power module may be configured to be rotated in one of a preset first rotational direction and a preset second rotational direction opposite to the first rotational direction. The step (c) may include (c1) calculating, by the operation information calculation module, driving information for rotating the power module in a direction, opposite to a rotational direction of the power module immediately before the calculated deviation information exceeds the preset percentage value, of the first rotational direction and the second rotational direction, when the calculated deviation information exceeds the preset percentage value.

The power module in the method for controlling the lawn mower robot may include a first power module located in the first direction, and a second power module located in the second direction. The operation information may include steering information for controlling rotations of the first power module and the second power module, respectively. The step (c) may include (c2) calculating, by the operation information calculation module, steering information for controlling the power module such that a rotational speed of the second power module is faster than a rotational speed of the first power module, when the calculated deviation information exceeds the preset percentage value and the calculated adjacent direction information is the first direction, and (c3) calculating, by the operation information calculation module, steering information for controlling the power module such that a rotational speed of the first power module is faster than a rotational speed of the second power module, when the calculated deviation information exceeds the preset percentage value and the calculated adjacent direction information is the second direction.

The step (d) in the method for controlling the lawn mower robot may include (d1) rotating the power module according to the calculated steering information, and (d) rotating the power module according to the calculated driving information.

The method for controlling the lawn mower robot may further include after the step (d), (e) operating the power module in the preset region.

The step (e) in the method for controlling the lawn mower robot may include (e1) detecting, by the position sensor module, position information related to the body part, (e2) calculating, by the deviation information calculation unit, deviation information related to a percentage of a volume of the body part deviated from the preset region, using the detected position information, (e3) calculating, by the operation information calculation module, steering information in a preset manner when the calculated deviation information is equal to or lower than a preset percentage value, and (e4) calculating, by the operation information calculation module, driving information in a preset manner when the calculated deviation information is equal to or lower than the preset percentage value.

The step (e) in the method for controlling the lawn mower robot may include after the step (e4), (e5) controlling, by a power module control unit, the power module to rotate according to the calculated steering information and the calculated driving information.

Advantageous Effects

According to the present disclosure, the following effects can be achieved.

First, when a lawn mower robot collides with an obstacle the robot is controlled to move in a direction opposite to its proceeding direction. Therefore, when the lawn mower robot collides with an obstacle while performing a task, the lawn mower robot can return to its original position without a separate user's manipulation.

In addition, when the lawn mower robot is deviated from a region where it is performing a work, the lawn mower robot may detect a direction in which a distance from a wire partitioning the region is the shortest. The lawn mower robot can be steered to be able to move in the detected direction by the shortest distance.

Therefore, even when the lawn mower robot is deviated from the region where it is performing a task, the lawn mower robot can return to its original region through a shortest path.

Also, the lawn mower robot which has collided with the obstacle can be controlled to move in an opposite direction to its originally traveling direction.

Thus, the lawn mower robot can return to a region where it has performed a task, namely, a region of which it has already been aware.

In addition, the lawn mower robot which has collided with the obstacle is controlled to restart its task in the region where it has already performed the task.

Accordingly, frequency of an occurrence of a skipped region can be reduced as compared with a case where a task is restarted in a region where a task has not been performed. Further, even if such a skipped region is generated, its area can be minimized.

In addition, after the lawn mower robot collided with the obstacle returns to its original region, whether or not the lawn mower robot has been deviated from its original task region can be calculated. When it is determined that the lawn mower robot is located in its original task region, the lawn mower robot can restart the task which the robot was performing.

Therefore, even when the lawn mower robot returns to its original task region after being deviated from the region due to the collision with the obstacle, the original task can be restarted. Accordingly, reliability of the task performed by the lawn mower robot can be improved.

BRIEF DESCRIPTION OF THE DRAWINGS

FIG. 14 is a conceptual view illustrating an exemplary traveling process of the lawn mower robot of FIG. 1.

DETAILED DESCRIPTION

Hereinafter, a lawn mower robot and a method for controlling the same according to embodiments will be described in detail, with reference to the accompanying drawings.

In the following description, description of some components may be omitted in order to clarify the technical characteristics of this disclosure.

1. Definition of Terms

The term "lawn" or "grass" as used in the following description means any plant that is growing on a specific area and can be mowed or cut by a lawn mower robot 10.

As used in the following description, the term "work" or "task" means a series of operations performed by the lawn mower robot 10 to mow and maintain lawn, grass and the like in a specific area.

The term "advancing", "moving forward" or "proceeding" as used in the following description means an operation in which the lawn mower robot 10 moves in a specific direction to perform a task.

As used in the following description, the term "moving backward" or "reversing" means an operation in which the lawn mower robot 10 moves in a direction opposite to a specific direction in which the lawn mower robot 10 moves to perform a task.

As used in the following description, the term "electrically connected" means that one component and another component are electrically connected to each other or connected to perform information communication. The electric connection may be realized by a conductor wire, a communication cable, and the like.

Figure 1:
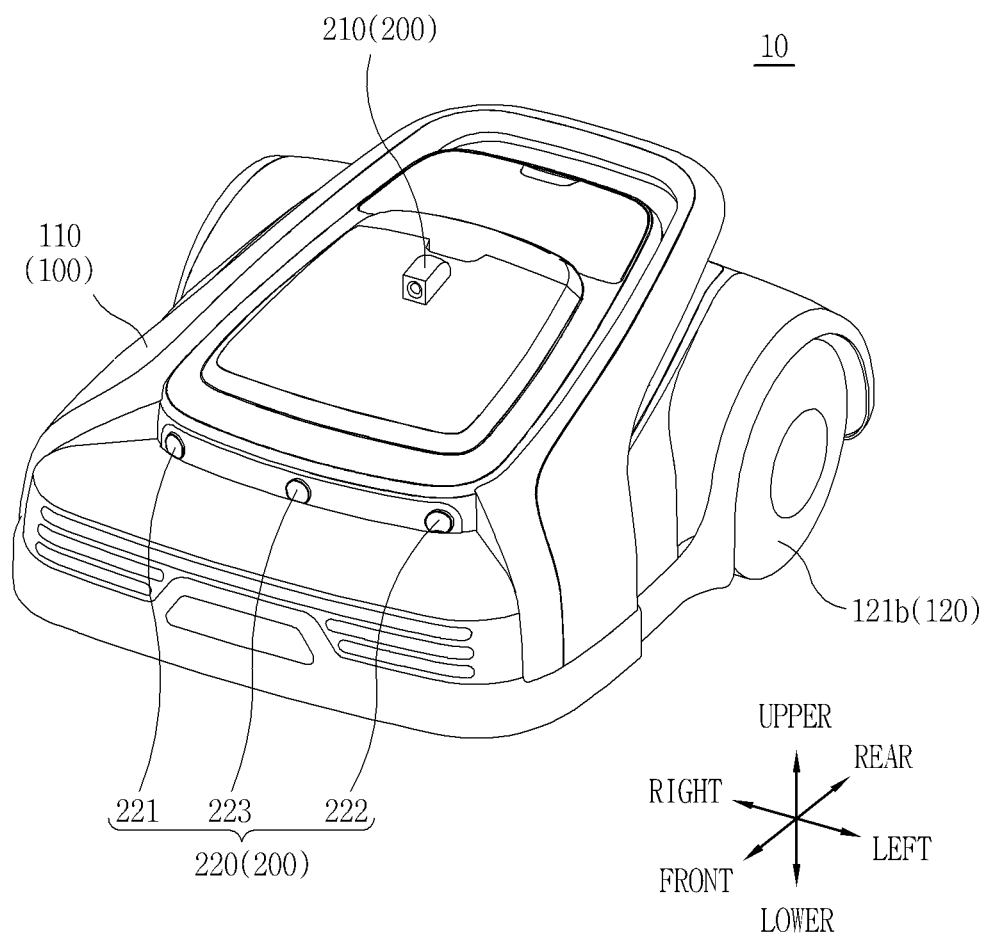
FIG. 1 is a perspective view illustrating appearance of a lawn mower robot in accordance with an embodiment.

The terms "front side", "rear side", "upper side", "lower side", "right side", and "left side" used in the following description will be understood with reference to a coordinate system shown in FIG. 1.

Figure 2:
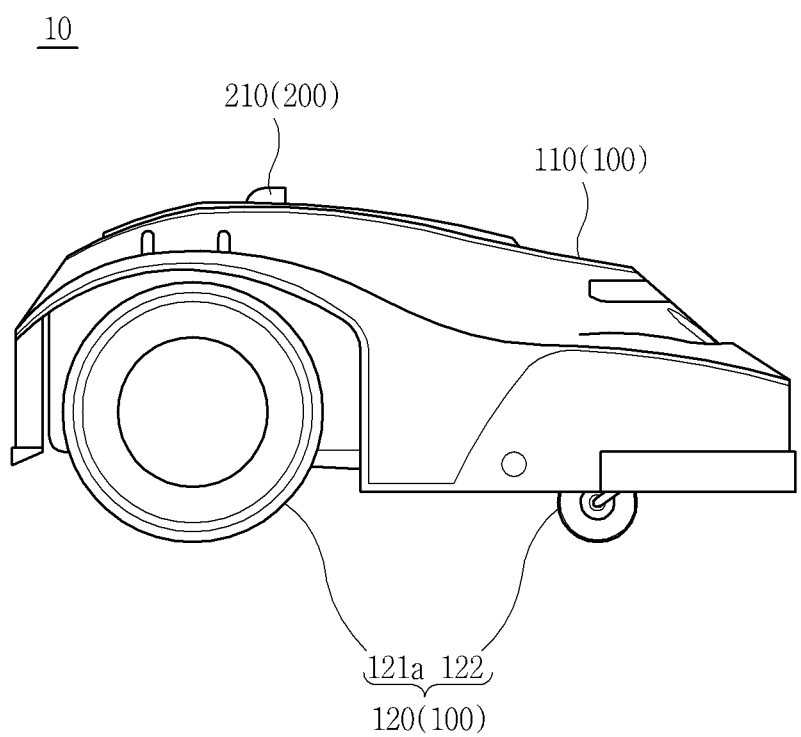
FIG. 2 is a lateral view illustrating appearance of one side of the lawn mower robot of FIG. 1.
Figure 3:
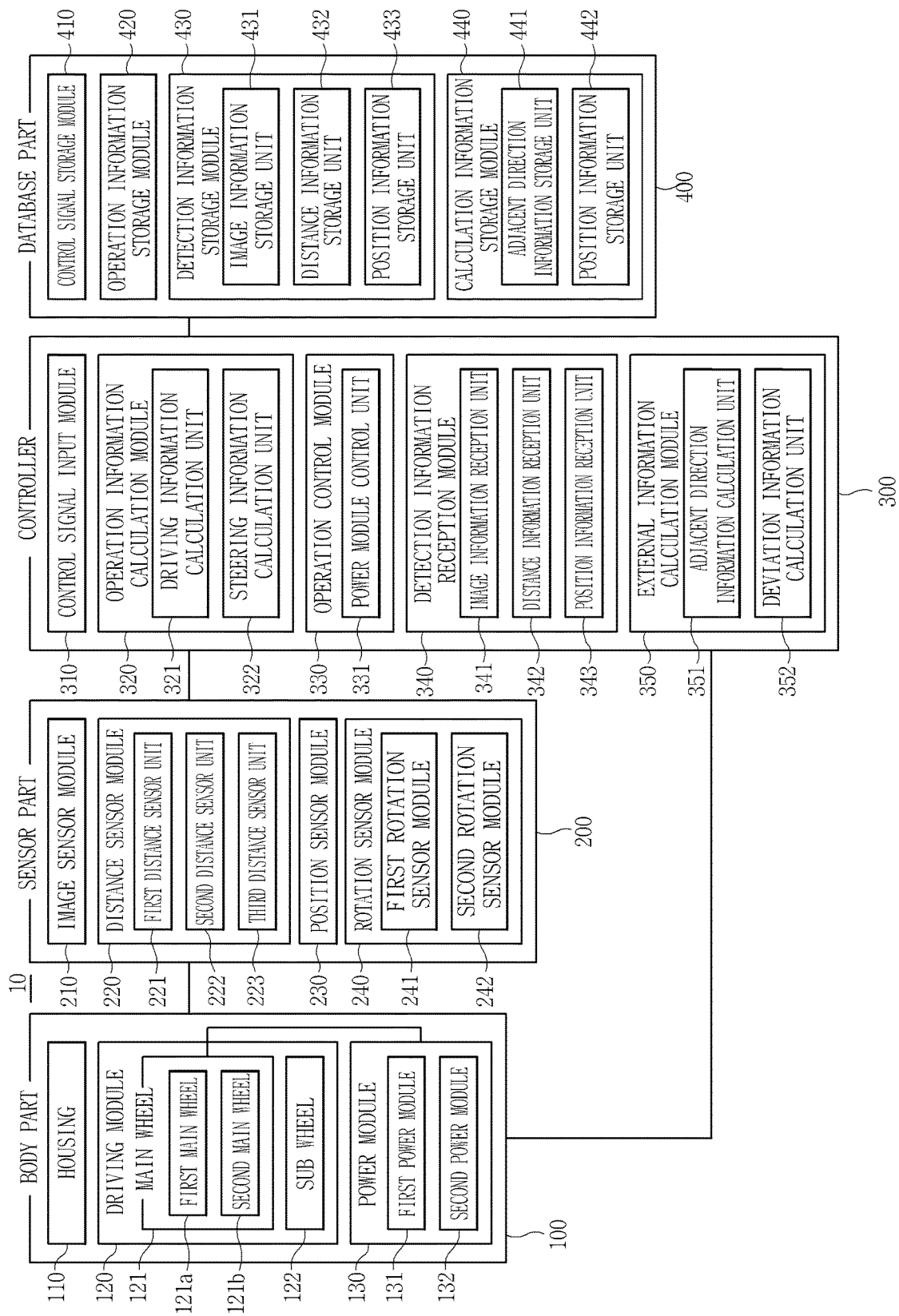
FIG. 3 is a block diagram illustrating a configuration of the lawn mower robot of FIG. 1.
Figure 4:
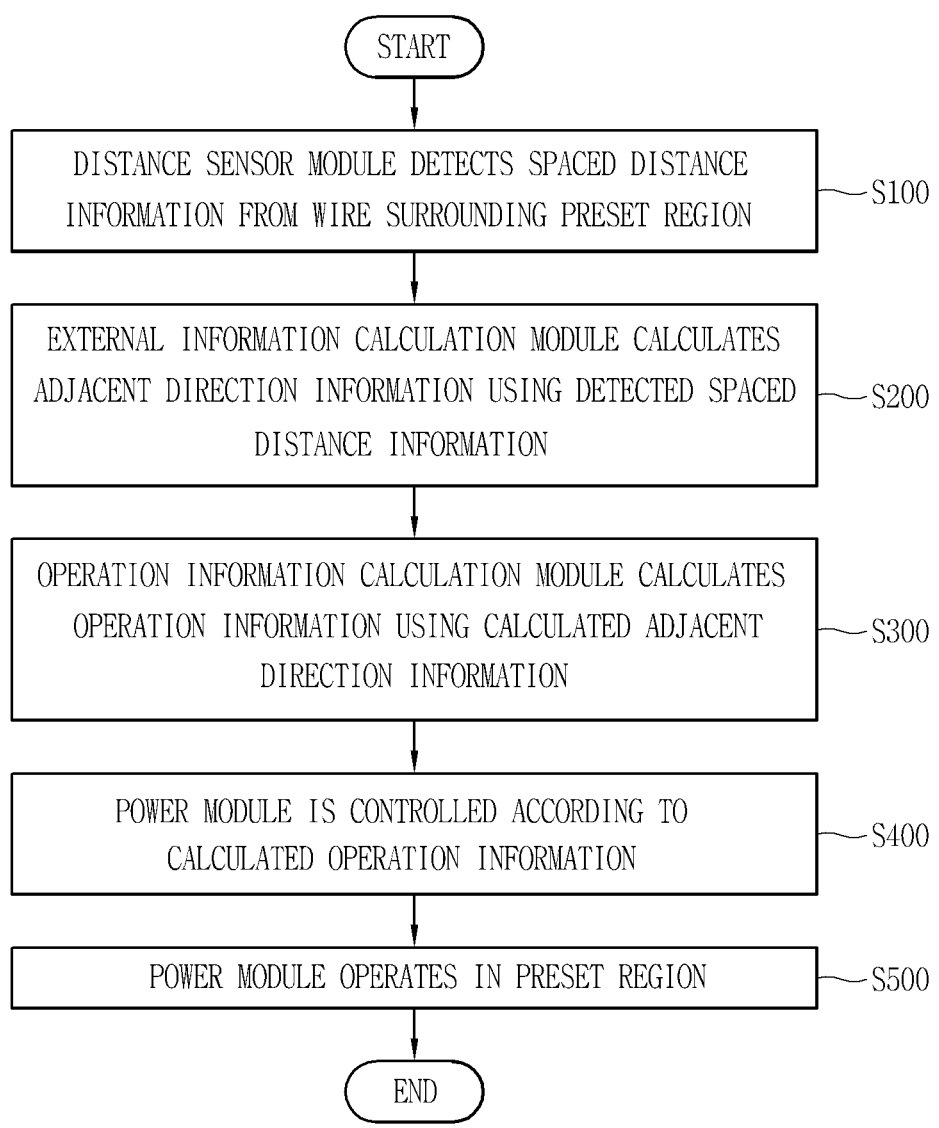
FIG. 4 is a flowchart illustrating a method for controlling a lawn mower robot in accordance with an embodiment.
Figure 5:
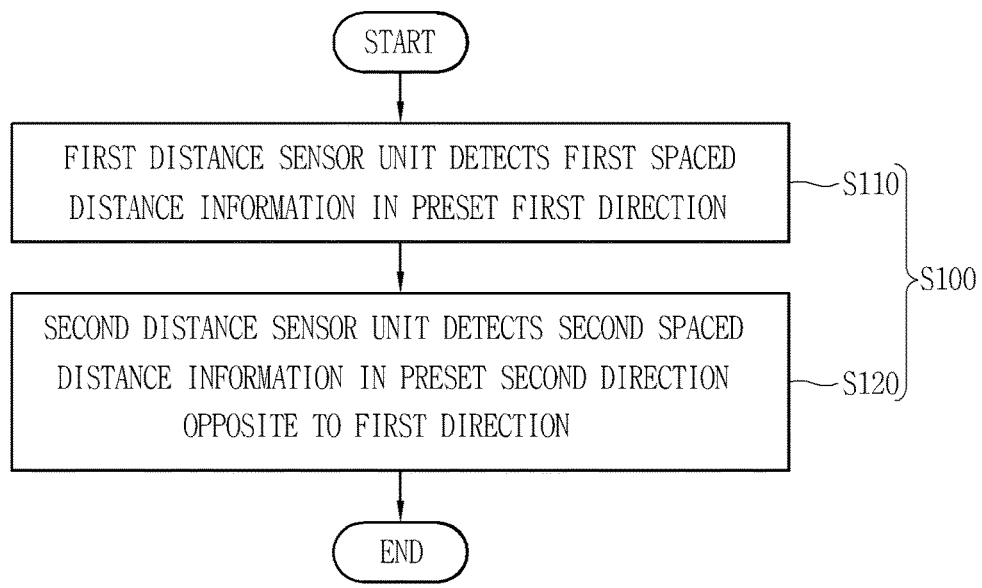
FIG. 5 is a flowchart illustrating a detailed flow of a step S100 of FIG. 4.
Figure 6:
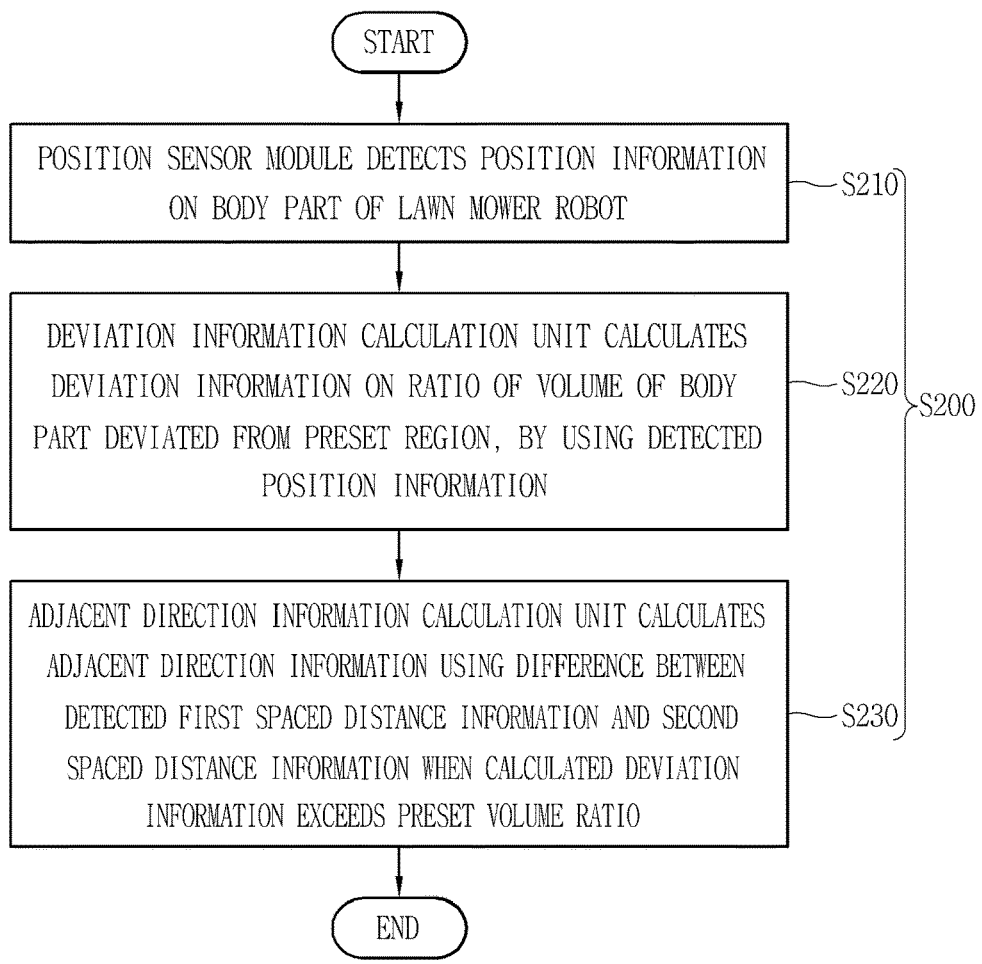
FIG. 6 is a flowchart illustrating a detailed flow of a step S200 of FIG. 4.
Figure 7:
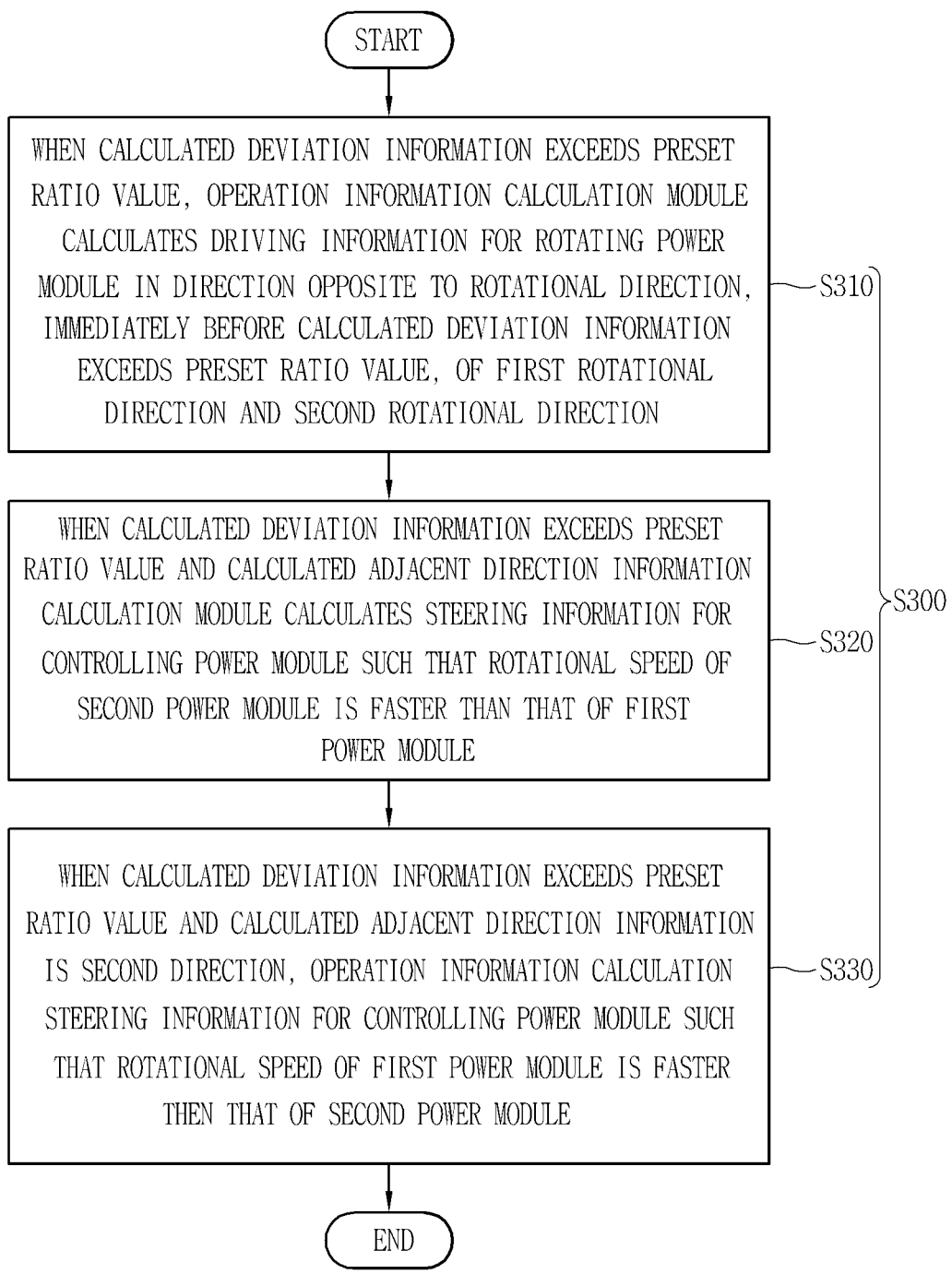
FIG. 7 is a flowchart illustrating a detailed flow of a step S300 of FIG. 4.
Figure 8:
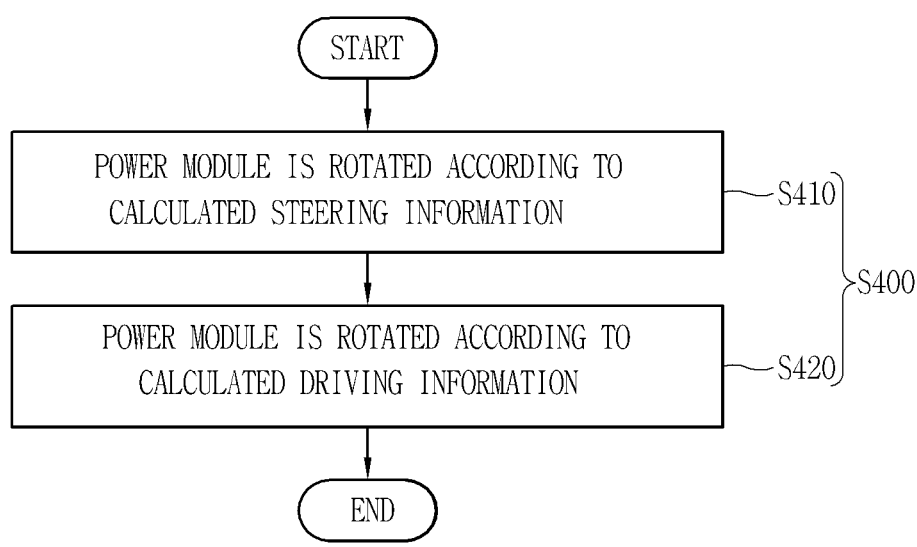
FIG. 8 is a flowchart illustrating a detailed flow of a step S400 of FIG. 4.
Figure 9:
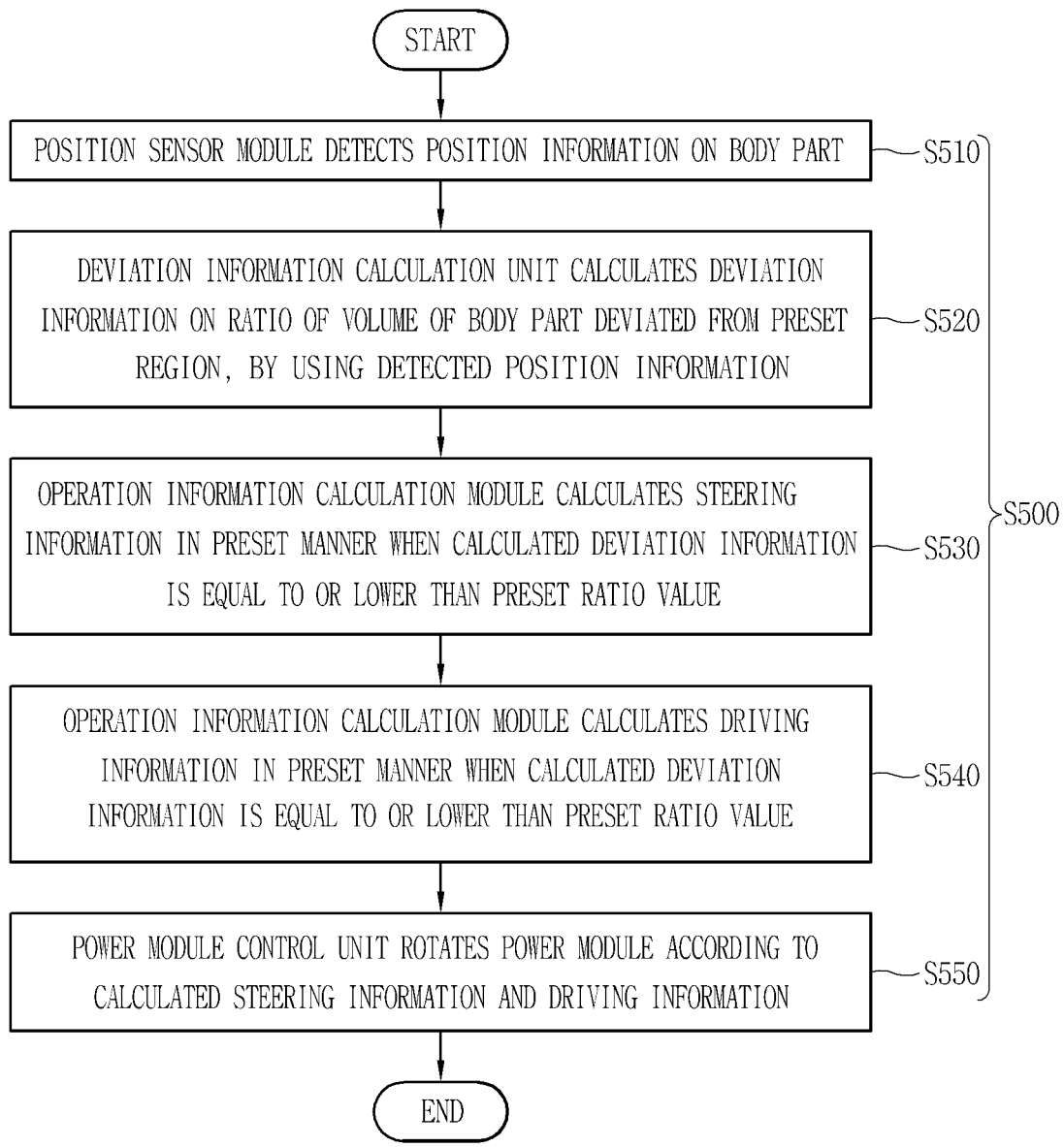
FIG. 9 is a flowchart illustrating a detailed flow of a step S500 of FIG. 4.

2. Description of Configuration of Lawn Mower Robot 10 According to Embodiment Referring to FIGS. 1 to 3, a lawn mower robot 10 according to an embodiment disclosed herein includes a body part 100, a sensor part 200, a controller 300, and a database part 400.

(1) Description of Body Part 100

The body part 100 defines a body of the lawn mower robot 10. The body part 100 includes a housing 110, a driving module 120, and a power module 130.

The housing 110 defines an outer side of the body part 100.

The housing 110 is preferably formed of a lightweight and highly durable material. In one embodiment, the housing 110 may be formed of a synthetic resin such as reinforced plastic or the like.

The sensor part 200 may be partially provided on an outer side of the housing 110. In addition, although not indicated by a reference numeral, a handle easily gripped by a user may be provided on the outer side of the housing 110.

A predetermined space is formed inside the housing 110. In the space, the part of the sensor part 200, the controller 300, and the database part 400 may be disposed.

Openings are formed at both sides of the housing 110, namely, at both right and left sides in the illustrated embodiment. A main wheel 121 is located in the openings.

An image sensor module 210 of the sensor part 200 is located on one side of the housing 110, namely, on a top of the housing 110 in the illustrated embodiment.

A sub wheel 122 is located on another side of the housing 110, namely, on a bottom of the housing 110 in the illustrated embodiment. A blade (not shown) is also provided on the bottom of the housing 110 to perform a task for maintaining the lawn.

A distance sensor module 220 of the sensor part 200 is located on another side of the housing 110, namely, on a front side in the illustrated embodiment.

The driving module 120 functions as a component which allows the lawn mower robot 10 to travel. The driving module 120 is connected to the power module 130.

A driving force generated by the power module 130 is transmitted to the driving module 120, so that the lawn mower robot 10 can move to the front or to the rear. In addition, as will be described later, the power module 130 may be provided in plurality and driven independently. Accordingly, the driving module 120 may also be independently driven to change a direction in which the lawn mower robot 10 travels.

The driving module 120 includes a main wheel 121 and a sub wheel 122.

The main wheel 121 is connected to the power module 130 and receives the driving force generated by the power module 130. The main wheel 121 is rotated by the driving force, so that the lawn mower robot 10 can move to the front or rear side.

In the illustrated embodiment, the main wheel 121 is located at the rear side of the housing 110.

The main wheel 121 may be provided in plurality. In the illustrated embodiment, the main wheel 121 includes a first main wheel 121a and a second main wheel 121b.

The first main wheel 121a is located in an opening formed at the right side of the rear of the housing 110. In addition, the second main wheel 121b is located in an opening formed at the left side of the rear of the housing 110.

The first main wheel 121a and the second main wheel 121b are disposed opposite to each other. The first main wheel 121a and the second main wheel 121b may be rotated independently of each other. To this end, the first main wheel 121a and the second main wheel 121b may be connected to a first power module 131 and a second power module 132, respectively.

The main wheel 121 may be formed in an arbitrary shape which is rotated by a rotational force so that the lawn mower robot 10 can move. In one embodiment, the main wheel 121 may be provided in the form of a wheel.

The sub wheel 122 is located on a bottom of the front of the lawn mower robot 10. The sub wheel 122 supports the front side of the lawn mower robot 10.

In the illustrated embodiment, the sub wheel 122 is provided by one in number. Alternatively, the sub wheel 122 may be provided in plurality. In the alternative embodiment, the lawn mower robot 10 may be stably supported by the plurality of sub wheels 122.

The sub wheel 122 may be provided in an arbitrary form to be rotatably coupled to the lawn mower robot 10. In one embodiment, the sub wheel 122 may be provided in the form of a wheel.

When the main wheel 121 is steered, the sub wheel 122 may be rotated in a direction in which the lawn mower robot 10 proceeds.

The power module 130 generates a driving force for the lawn mower robot 10. The power module 130 may be electrically connected to the controller 300 to receive driving information and steering information.

In one embodiment, the power module 130 may be provided as a motor. The power module 130 may be accommodated in an inner space of the housing 110.

The power module 130 may receive power from outside. In one embodiment, the power module 130 may receive power from a battery (not shown) provided in the lawn mower robot 10. The power module 130 may be electrically connected to the battery (not shown).

The driving module 130 is connected to the main wheel 121. When the power module 130 is rotated, the main wheel 121 may also be rotated. Accordingly, the driving force generated by the power module 130 is transmitted to the main wheel 121.

The power module 130 may be provided in plurality. In the illustrated embodiment, the power module 130 includes a first power module 131 and a second power module 132.

The first power module 131 is connected to the first main wheel 121a. When the first power module 131 is rotated, the first main wheel 121a may be rotated. The second power module 132 is connected to the second main wheel 121b. When the second power module 132 is rotated, the second main wheel 121b may be rotated.

Accordingly, the lawn mower robot 10 may move forward or backward by the first power module 131 and the second power module 132.

The first power module 131 and the second power module 132 may be driven independently of each other. That is, whether each of the first power module 131 and the second power module 132 rotates, the number of turns, etc. may be independently controlled. To this end, the first power module 131 and the second power module 132 may be electrically connected to the controller 300, respectively.

As the first power module 131 and the second power module 132 are rotated at different speeds, a direction in which the lawn mower robot 10 proceeds may change.

(2) Description of Sensor Part 200

The sensor part 200 detects information on an external environment in which the lawn mower robot 10 operates. In addition, the sensor part 200 detects information on a driving situation of the lawn mower robot 10. Various pieces of information detected by the sensor part 200 may be transmitted to the controller 300, and the controller 300 may generate control information suitable for situations.

The sensor part 200 may be provided in an arbitrary form, which is capable of detecting information on an external environment or a driving situation of the lawn mower robot 10.

The sensor part 200 may be electrically connected to a battery (not shown). Power required for an operation of the sensor part 200 may be supplied by the connection.

The sensor part 200 includes an image sensor module 210, a distance sensor module 220, a position sensor module 230, and a rotation sensor module 240.

The image sensor module 210 is configured to detect external image information related to one side of the lawn mower robot 10. In one embodiment, the image sensor module 210 may be configured to detect image information related to the front side in a direction in which the lawn mower robot 10 is traveling.

The image sensor module 210 may be provided in any form capable of acquiring image information, that is, still images or moving images (videos). In one embodiment, the image sensor module 210 may be implemented as a camera, a camcorder, or the like.

The image sensor module 210 may be electrically connected to a detection information reception module 340 of the controller 300. The image information detected by the image sensor module 210 may be transferred to an image information reception unit 341 and used to calculate operation information.

In the illustrated embodiment, the image sensor module 210 is located on a top of the housing 110. The image sensor module 210 may be disposed at any position where image information can be acquired.

The distance sensor module 220 is configured to detect a distance between the lawn mower robot 10 and an arbitrary object outside the lawn mower robot 10. That is, the distance sensor module 220 is configured to detect spaced distance information which is information on a distance between the lawn mower robot 10 and the object.

The distance sensor module 220 may be provided in any form capable of detecting a distance from an arbitrary object. In one embodiment, the distance sensor module 220 may be configured as an ultrasonic sensor, an infrared ray (IR) sensor, a light detection and ranging (LiDAR) sensor, a radio detecting and ranging (Radar) sensor, a camera (stereo camera), or the like.

The distance sensor module 220 may be electrically connected to the detection information reception module 340 of the controller 300. The spaced distance information detected by the distance sensor module 220 may be transferred to a distance information reception unit 342, and used to calculate operation information.

The distance sensor module 220 is located on the front side of the housing 110.

The distance sensor module 220 may be provided in plurality. In the illustrated embodiment, the distance sensor module 220 includes a first distance sensor unit 221, a second distance sensor unit 222, and a third distance sensor unit 223.

The first distance sensor unit 221 may be configured to detect first spaced distance information D1 that is spaced distance information in a preset first direction. To this end, the first distance sensor unit 221 may be located to be inclined toward the first direction.

In the illustrated embodiment, the first direction indicates a right side, and the first distance sensor unit 221 may be inclined to the right side of the front of the housing 110.

The second distance sensor unit 222 may be configured to detect second spaced distance information D2 which is spaced distance information in a preset second direction. To this end, the second distance sensor unit 222 may be located to be inclined toward the second direction.

In the illustrated embodiment, the second direction indicates a left side, and the second distance sensor unit 222 may be located to be inclined to the left side of the front of the housing 110.

The third distance sensor unit 223 may be configured to detect third spaced distance information D3 which is spaced distance information in a preset third direction. To this end, the third distance sensor unit 223 may be located to face the third direction.

In the illustrated embodiment, the third direction indicates the front side, and the third distance sensor unit 223 may be located to face the front side of the housing 110.

The third direction may be located between the first direction and the second direction. In the illustrated embodiment, the third direction is located to face the front side, namely, between the first direction facing the right side and the second direction facing the left side.

Therefore, the first distance sensor unit 221 detects the first spaced distance information D1 from an object located at the right side of the lawn mower robot 10. In addition, the second distance sensor unit 222 detects the second spaced distance information D2 from an object located at the left side of the lawn mower robot 10. Furthermore, the third distance sensor unit 223 detects the third spaced distance information D3 from an object located at the front side of the lawn mower robot 10.

This takes into account that the lawn mower robot 10 generally travels to the front side and to the right and left sides with respect to the front side. Accordingly, frequency at which the lawn mower robot 10 collides with an object present on a travel path can be reduced, so that an efficient lawn maintenance work can be performed.

The position sensor module 230 is configured to detect position information related to the lawn mower robot 10.

That is, the position sensor module 230 may set an area in which the lawn mower robot 10 performs a task in one coordinate system, and detect the position of the lawn mower robot 10 in the form of coordinate information.

The position sensor module 230 may be provided in any form capable of detecting a position of a currently moving object in a predetermined manner. In one embodiment, the position sensor module 230 may be configured as a Global Positioning System (GPS) sensor.

The position sensor module 230 may be accommodated in a predetermined space formed inside the housing 110. Alternatively, the position sensor module 230 may be located outside the housing 110 to improve reception efficiency.

The position sensor module 230 may be electrically connected to the detection information reception module 340 of the controller 300. The position information detected by the position sensor module 230 may be transferred to a position information reception unit 343 and used to calculate operation information.

A rotation sensor module 240 is configured to detect rotation information related to the number of turns of the main wheel 121. The rotation sensor module 240 may be provided in the main wheel 121 or the power module 130. This results from that the main wheel 121 and the power module 130 have the same number of turns or revolutions.

The rotation sensor module 240 may be provided in any form capable of detecting the number of turns or rotations of a rotating object. In one embodiment, the rotation sensor module 240 may be configured as a photo sensor or the like.

The rotation sensor module 240 may be provided in plurality. In the illustrated embodiment, the rotation sensor module 240 is configured by totally two modules, namely, a first rotation sensor module 241 and a second rotation sensor module 242. This is because the main wheel 121 and the power module 130 are provided by two in number, respectively.

The first rotation sensor module 241 is located adjacent to the first main wheel 121*a* or the first power module 131. The first rotation sensor module 241 may detect the number of rotations of the first main wheel 121*a* or the first power module 131.

The second rotation sensor module 242 is located adjacent to the second main wheel 121*b* or the second power module 132. The second rotation sensor module 242 may detect the number of rotations of the second main wheel 121*b* or the second power module 132.

(3) Description of Controller 300

The controller 300 receives a control signal from a user and calculates operation information for operating the lawn mower robot 10.

In addition, the controller 300 may receive various detection information detected by the sensor part 200. To this end, the controller 300 is electrically connected to the sensor part 200.

The controller 300 may calculate operation information using the received control signal or detection information. In addition, the controller 300 may control each component, specifically, the power module 130 of the lawn mower robot 10 according to the calculated operation information. To this end, the controller 300 is electrically connected to the power module 130.

Also, the controller 300 is electrically connected to the database part 400. A control signal input by a user, detection information detected by the sensor part 200, and various pieces of information calculated by the controller 300 may be stored in the database part 400.

Various modules and units of the controller 300 to be described later may be electrically connected to one another. Accordingly, information input to one module or unit or information calculated by one module or unit may be transferred to another module or unit.

The controller 300 may be provided in any form capable of inputting, outputting, and calculating information. In one embodiment, the controller 300 may be configured as a microprocessor, a central processing unit (CPU), a printed circuit board (PCB), or the like.

The controller 300 is located in a predetermined space formed inside the housing 110. The controller 300 may be hermetically accommodated in the space so as not to be affected by external moisture and the like.

The controller 300 includes a control signal input module 310, an operation information calculation module 320, an operation control module 330, a detection information reception module 340, and an external information calculation module 350.

The control signal input module 310 receives a control signal which is input by a user for operating the lawn mower robot 10. The user may input such a control signal through a terminal or the like. In one embodiment, the terminal may be a smartphone or the like.

In another embodiment, the user may input a control signal through an input interface (not shown) included in the lawn mower robot 10. In the above embodiment, the control signal input module 310 may be electrically connected to the input interface (not shown).

The control signal input to the control signal input module 310 is transmitted to the operation information calculation module 320. In addition, the control signal input to the control signal input module 310 may be transmitted to a control signal storage module 410 of the database part 400.

The operation information calculation module 320 calculates operation information for operating the lawn mower robot 10.

The operation information calculation module 320 may calculate operation information by using a control signal input through the control signal input module 310 or each information calculated by the external information calculation module 350.

In one embodiment, the operation information may include driving information and steering information. The driving information may be defined as operation information related to forward or backward movement of the lawn mower robot 10. In addition, the steering information may be defined as operation information related to a direction in which the lawn mower robot 10 proceeds to the left or the right.

The operation information calculated by the operation information calculation module 320 is transmitted to the operation control module 330. The operation information calculated by the operation information calculation module 320 is also transmitted to an operation information storage module 420 of the database part 400.

The operation information calculation module 320 includes a driving information calculation unit 321 and a steering information calculation unit 322.

The driving information calculation unit 321 calculates the driving information. The driving information calculation unit 321 may calculate driving information by using a control signal input through the control signal input module 310 or each information calculated by the external information calculation module 350.

The driving information calculated by the driving information calculation unit 321 may include information on a rotational direction of the first power module 131 and the second power module 132.

In detail, the first power module 131 and the second power module 132 may be rotated in a preset first rotational direction. In addition, the first power module 131 and the second power module 132 may be rotated in a preset second rotational direction opposite to the first rotational direction. That is, the first power module 131 and the second power module 132 may be rotated in any one of the first rotational direction and the second rotational direction.

In one embodiment, the first rotational direction may be a direction in which the lawn mower robot 10 moves forward, that is, a counterclockwise direction when viewed from the left side of the lawn mower robot 10.

Similarly, the second rotational direction may be a direction in which the lawn mower robot 10 moves backward, that is, a clockwise direction when viewed from the left side of the lawn mower robot 10.

As described above, the first power module 131 and the second power module 132 may be controlled independently. Thus, the driving information may be classified into first driving information for controlling the first power module 131 and second driving information for controlling the second power module 132.

The first driving information includes control information for rotating or not rotating the first power module 131 in one of the first rotational direction and the second rotational direction. Similarly, the second driving information includes control information for rotating or not rotating the second power module 132 in one of the first rotational direction and the second rotational direction.

For example, when the first driving information and the second driving information are all calculated as the first rotational direction and the first steering information and the second steering information are calculated as the same, the lawn mower robot 10 travels straight toward the front side.

On the contrary, when the first driving information and the second driving information are all calculated as the second rotational direction, and the first steering information and the second steering information are calculated as the same, the lawn mower robot 10 moves backward toward the rear side.

As another example, a case may be considered in which the first driving information is calculated as information related to non-rotation and the second driving information is calculated as the first rotational direction. In this case, the lawn mower robot 10 performs a curved motion centering on the first main wheel 121a connected to the first power module 131 as an axis.

On the contrary, a case may be considered in which the first driving information is calculated as the first rotational direction and the second driving information is calculated as information related to non-rotation. In this case, the lawn mower robot 10 performs a curved motion centering on the second main wheel 121b connected to the second power module 132 as an axis.

The driving information calculated by the driving information calculation unit 321, specifically, the first driving information and the second driving information, are transmitted to the operation control module 330 and the operation information storage module 420.

The steering information calculation unit 322 calculates the steering information. The steering information calculation unit 322 may calculate the steering information by using a control signal input through the control signal input module 310 or each information calculated by the external information calculation module 350.

The steering information calculated by the steering information calculation unit 322 may include information related to the number of turns or a rotational speed of each of the first power module 131 and the second power module 132.

As described above, the first power module 131 and the second power module 132 may be controlled independently. Thus, the steering information may be classified into first steering information for controlling the first power module 131 and second steering information for controlling the second power module 132.

The first steering information includes control information related to the number of turns or rotations or a rotational speed of the first power module 131. Similarly, the second steering information includes control information related to the number turns or rotations or a rotational speed of the second power module 132.

Therefore, when the first steering information and the second steering information are calculated differently, the lawn mower robot 10 may be rotated.

For example, when the first steering information is calculated to have a larger value than the second steering information, the rotational speed of the first power module 131 is faster than the rotational speed of the second power module 132. Accordingly, the lawn mower robot 10 performs a curved motion by which the second main wheel 121b connected to the second power module 132 is disposed radially inward.

On the contrary, when the second steering information is calculated to have a larger value than the first steering information, the rotational speed of the second power module 132 is faster than the rotational speed of the first power module 131. Accordingly, the lawn mower robot 10 performs a curved motion in which the first main wheel 121a connected to the first power module 131 is disposed radially inward.

The steering information calculated by the steering information calculation unit 322, specifically, the first steering information and the second steering information, are transmitted to the operation control module 330 and the operation information storage module 420.

According to the combination of the first and second driving information and the first and second steering information described above, the lawn mower robot 10 can travel in various directions.

The operation control module 330 controls the power module 130 according to the operation information calculated by the operation information calculation module 320. The operation control module 330 is electrically connected to the operation information calculation module 320.

The operation control module 330 includes a power module control unit 331.

The power module control unit 331 is configured to control the power module 130 in correspondence with the calculated operation information.

In detail, the power module control unit 331 may control the first power module 131 according to the calculated first driving information and first steering information. In addition, the power module control unit 331 may control the second power module 132 according to the calculated second driving information and second steering information.

The power module control unit 331 is electrically connected to the power module 130.

The detection information reception module 340 is configured to receive each information detected by the sensor part 200. The detection information reception module 340 is electrically connected to the sensor part 200.

Each information transmitted to the detection information reception module 340 is transferred to the external information calculation module 350 and used to calculate each information. The detection information reception module 340 is electrically connected to the external information calculation module 350.

The detection information reception module 340 is electrically connected to the database part 400. Each information detected by the sensor part 200 may be transmitted to the database part 400 through the detection information reception module 340.

The detection information reception module 340 includes an image information reception unit 341, a distance information reception unit 342, and a position information reception unit 343.

The image information reception unit 341 receives image information detected by the image sensor module 210. The image information reception unit 341 is electrically connected to the image sensor module 210.

The image information may be utilized to calculate whether there is an obstacle such as an arbitrary object on a path on which the lawn mower robot 10 travels. Also, the image information may be provided to the user in the form of visualization information, so that the user can recognize a current task situation.

The image information received by the image information reception unit 341 may be delivered to a user terminal (not shown) in the form of visualization information. To this end, the image information reception unit 341 may be electrically connected to the terminal (not shown).

In one embodiment, the image information reception unit 341 and the terminal (not shown) may be connected in a manner such as Wi-Fi or Bluetooth.

The image information received by the image information reception unit 341 is transmitted to a detection information storage module 430 of the database part 400. The image information reception unit 341 is electrically connected to an image information storage unit 431.

The distance information reception unit 342 is configured to receive spaced distance information detected by the distance sensor module 220. The distance information reception unit 342 is electrically connected to the distance sensor module 220.

In the illustrated embodiment, the spaced distance information detected by the distance sensor module 220 may be classified into three pieces of information.

That is, the spaced distance information may be classified into first spaced distance information D1 in a first direction, second spaced distance information D2 in a second direction, and third spaced distance information D3 in a third direction. The distance sensor module 220 may receive all of the first to third spaced distance information D1, D2, D3.

The first to third spaced distance information D1, D2, D3 may be used to calculate adjacent direction information related to a direction in which a spaced distance between the lawn mower robot 10 and a wire W is the shortest.

Each spaced distance information D1, D2, D3 received by the distance information reception unit 342 is transmitted to the external information calculation module 350. The distance information reception unit 342 is electrically connected to an adjacent direction information calculation unit 351 of the external information calculation module 350.

Each spaced distance information D1, D2, D3 received by the distance information reception unit 342 is transmitted to the detection information storage module 430. The distance information reception unit 342 is electrically connected to a distance information storage unit 432.

The position information reception unit 343 is configured to receive position information detected by the position sensor module 230. The position information reception unit 343 is electrically connected to the position sensor module 230.

The position information received by the position information reception unit 343 is utilized to accurately calculate the position of the lawn mower robot 10. In addition, the position information is used to calculate a region where the lawn mower robot 10 is located, and a volume percentage deviated from the region.

The position information received by the position information reception unit 343 is transmitted to the external information calculation module 350. The position information reception unit 343 is electrically connected to the deviation information calculation module 352.

The position information received by the position information reception unit 343 is transmitted to a position information storage unit 433 of the database part 400. The position information reception unit 343 is electrically connected to the position information storage unit 433.

The external information calculation module 350 is configured to calculate information related to an operating state of the lawn mower robot 10 by using each information received by the detection information reception module 340.

In detail, the external information calculation module 350 may calculate information related to the travel of the lawn mower robot 10. In addition, the external information calculation module 350 may calculate information related to an external environment in which the lawn mower robot 10 performs a task.

The external information calculation module 350 is electrically connected to the detection information reception module 340. Each information transmitted from the sensor part 200 to the detection information reception module 340 may be transferred to the external information calculation module 350.

The external information calculation module 350 is electrically connected to the database part 400. Each information calculated by the external information calculation module 350 may be transferred to the database part 400.

Each information calculated by the external information calculation module 350 is transferred to the operation information calculation module 320 and used to calculate operating information. The external information calculation module 350 is electrically connected to the operation information calculation module 320.

The external information calculation module 350 includes an adjacent direction information calculation unit 351 and a deviation information calculation unit 352.

The adjacent direction information calculation unit 351 calculates adjacent direction information related to a direction in which a distance between the lawn mower robot 10 and an arbitrary object is the shortest.

That is, the adjacent direction information may be defined as information related to a direction in which the lawn mower robot 10 is closer to the arbitrary object.

In one embodiment, the object may be an obstacle such as a stone, or may be a wire W for partitioning a region where the lawn mower robot 10 performs a task.

The adjacent direction information calculation unit 351 is electrically connected to the distance information reception unit 342. Each spaced distance information detected by the distance sensor module 220 may be transferred to the adjacent direction information calculation unit 351 through the distance information reception unit 342.

The adjacent direction information calculation unit 351 calculates adjacent direction information by using the received first to third spaced distance information D1, D2, and D3. The adjacent direction information calculation unit 351 may calculate the adjacent direction information by using differences among the first to third spaced distance information D1, D2, and D3.

In detail, the adjacent direction information calculation unit 351 may calculate respective differences among the first spaced distance information D1, the second spaced distance information D2, and the third spaced distance information D3.

That is, the adjacent direction information calculation unit 351 calculates a difference between the first spaced distance information D1 and the second spaced distance information D2, and a difference between the second spaced distance information D2 and the third spaced distance information D3, and a difference between the first spaced distance information D1 and the third spaced distance information D3.

In addition, the adjacent direction information calculation unit 351 compares the calculated differences so as to calculate the adjacent direction information.

Alternatively, the adjacent direction information calculation unit 351 may calculate adjacent direction information by using magnitudes of the first to third spaced distance information D1, D2, and D3.

The adjacent direction information calculation unit 351 may calculate the adjacent direction information as one of a first direction, a second direction, and a third direction.

When the adjacent direction information is calculated as the first direction, the lawn mower robot 10 may be determined to be closest to the object in the first direction.

Similarly, when the adjacent direction information is calculated as the second direction, the lawn mower robot 10 may be determined to be closest to the object in the second direction.

In addition, when the adjacent direction information is calculated as the third direction, the lawn mower robot 10 may be determined to be closest to the object in the third direction.

A detailed description of the process of controlling the operation of the lawn mower robot 10 according to the calculation result will be given later.

The adjacent direction information calculated by the adjacent direction information calculation unit 351 is transmitted to the operation information calculation module 320. The operation information calculation module 320 may calculate driving information or steering information according to the transmitted adjacent direction information. The adjacent direction information calculation unit 351 is electrically connected to the operation information calculation module 320.

The adjacent direction information calculated by the adjacent direction information calculation unit 351 is transmitted to the calculation information storage module 440. The calculation information storage module 440 may store the transferred adjacent direction information. The adjacent direction information calculation unit 351 is electrically connected to the calculation information storage module 440.

The deviation information calculation unit 352 calculates deviation information related to a degree to which the lawn mower robot 10 has been deviated from (has been forcedly moved out of) a specific region.

That is, the deviation information may be defined as information related to a percentage of an area or a volume deviated from a preset region.

In one embodiment, the preset region may be one of a plurality of small regions partitioned (divided) for the lawn mower robot 10 to perform a task.

The deviation information calculation unit 352 is electrically connected to the position information reception unit 343. Position information detected by the position sensor module 230 may be transferred to the deviation information calculation unit 352 through the position information reception unit 343.

As described above, the position information may be configured in the form of coordinate information according to a GPS system. The deviation information calculation unit 352 may calculate the position of the lawn mower robot 10 using the position information.

In addition, the deviation information calculation unit 352 may receive position information related to the divided small regions, stored in the position information storage unit 433. To this end, the deviation information calculation unit 352 is electrically connected to the database part 400.

Accordingly, when the lawn mower robot 10 covers boundaries of the divided small regions, the deviation information calculation unit 352 may calculate a percentage of an area or volume of the lawn mower robot 10 located in each small region.

In particular, information related to an area or volume of the lawn mower robot 10 located outside a specific small region where the lawn mower robot 10 is performing a work may be defined as the deviation information. That is, the deviation information is information related to a percentage of deviation from the specific small region.

Also, the deviation information calculation unit 352 compares the calculated deviation information with a preset percentage value. In one embodiment, the preset percentage value may be 50%. That is, the preset percentage value indicates that half of the lawn mower robot 10 has been deviated from a small region where the lawn mower robot 10 was performing a work.

The preset percentage value may change depending on an operating environment of the lawn mower robot 10. In addition, a user may directly input a preset percentage value through an input interface (not shown) or a terminal (not shown).

A detailed description of the process of controlling the operation of the lawn mower robot 10 according to the calculation and comparison results will be given later.

The deviation information calculated by the deviation information calculation unit 352 is transmitted to the operation information calculation module 320. The operation information calculation module 320 may calculate driving information or steering information according to the deviation information. The deviation information calculation unit 352 is electrically connected to the operation information calculation module 320.

The deviation information calculated by the deviation information calculation unit 352 is transmitted to the operation information calculation module 440. The calculation information storage module 440 may store the transferred deviation information. The deviation information calculation unit 352 is electrically connected to the calculation information storage module 440.

(4) Description of Database Part 400

The database part 400 stores various information related to the operation of the lawn mower robot 10.

The database part 400 may be provided in any form capable of inputting, outputting, and storing information. In one embodiment, the database part 400 may be provided in the form of an SD card, a micro SD card, a USB memory, an SSD, or the like.

The database part 400 is electrically connected to the control signal input module 310. A control signal input to the control signal input module 310 may be transmitted to the database part 400 and stored.

The database part 400 is electrically connected to the operation information calculation module 320. Operation information calculated by the operation information calculation module 320 may be transferred to the database part 400 and stored.

The database part 400 is electrically connected to the sensor part 200 through the detection information reception module 340. Each detection information detected by the sensor part 200 may be transferred to the database part 400 and stored.

The database part 400 is electrically connected to the external information calculation module 350. Each information calculated by the external information calculation module 350 may be transferred to the database part 400 and stored.

Each of the stored information may be stored by mapping to an operating time and environment of the lawn mower robot 10. That is, each information related to a task performed by the lawn mower robot 10 and a small (partial) area on which the lawn mower robot 10 performed the task at a specific time point may be stored in a mapping manner.

The stored data may be used as big data for the lawn mower robot 10 to efficiently perform tasks. The lawn mower robot 10 may also perform tasks more effectively by learning the stored information through artificial intelligence (AI).

The database part 400 includes a control signal storage module 410, an operation information storage module 420, a detection information storage module 430, and a calculation information storage module 440. Each of the modules 410, 420, 430, and 440 may be electrically connected to one another.

The control signal storage module 410 stores a control signal input to the control signal input module 310. The control signal storage module 410 is electrically connected to the control signal input module 310.

The control signal stored in the control signal storage module 410 may be mapped to environment information in which the lawn mower robot 10 operates and then stored. Accordingly, the control signal storage module 410 may classify and store a control signal with respect to a task desired by the user according to a specific environment.

The control signals stored in the control signal storage module 410 may be utilized when the user wants to perform tasks automatically. That is, when an environment of a time for which the lawn mower robot 10 operates is similar to a specific environment to which the stored control signal is mapped, the lawn mower robot 10 may be controlled according to the corresponding control signal.

The operation information storage module 420 stores operation information calculated by the operation information calculation module 320. The operation information storage module 420 is electrically connected to the operation information calculation module 320.

The operation information storage module 420 may store operation information according to a specific control signal. The operation information storage module 420 is electrically connected to the control signal storage module 410.

The operation information stored in the operation information storage module 420 may be mapped to environment information in which the lawn mower robot 10 operates and a control information for operating the lawn mower robot 10 and then stored. Accordingly, the operation information storage module 420 may classify and store operation information on a task to be performed by the lawn mower robot 10 according to a specific environment and a specific control signal.

The operation information stored in the operation information storage module 420 may be utilized when the user wants to perform a task automatically. That is, when an environment of a time for which the lawn mower robot 10 operates or a control signal for operating the lawn mower robot 10 is similar to a specific environment or specific control signal mapped with operation information, the power module 130 may be operated according to the corresponding operation information.

As described above, the operation information includes driving information and steering information. Accordingly, the driving information and the steering information may be classified and stored in the operation information storage module 420.

The detection information storage module 430 stores each information detected by the sensor part 200. Each information detected by the sensor part 200 may be transmitted to the detection information storage module 430 through the detection information reception module 340. The detection information storage module 430 is electrically connected to the detection information reception module 340.

The detection information storage module 430 may store detection information according to a specific control signal and specific operation information. The detection information storage module 430 is electrically connected to the control signal storage module 410 and the operation information storage module 420.

The operation information stored in the detection information storage module 430 may be mapped to the environment information, the control signal, and the operation information all related to the operation of the lawn mower robot 10, and then stored.

That is, the detection information storage module 430 may classify and store information on an external environment, which is detected while the lawn mower robot 10 performs a task, according to a specific environment, a control signal, and operation information.

As described above, the information detected by the sensor part 200 may include image information, spaced distance information, position information, and rotation information. Accordingly, the detection information storage module 430 includes an image information storage unit 431, a distance information storage unit 432, and a position information storage unit 433.

The image information storage unit 431 stores transferred image information. The distance information storage unit 432 stores transferred spaced distance information, and the position information storage unit 433 stores transferred position information.

The information storage units 431, 432, 433 may be electrically connected to one another. In addition, the information stored in each of the information storage units 431, 432, 433 may be mapped to one another according to a working time, a working environment, and the like.

Therefore, when the lawn mower robot 10 is performing a task at a specific position at a specific time, it may be determined whether an obstacle such as a stone or the like is present, whether the obstacle is located adjacent to a specific local (small) area, and the like.

As a result, the lawn mower robot 10 can recognize in advance the presence of the obstacle at the specific position while performing a task, and thus avoid the obstacle. This may result in improving operation efficiency of the lawn mower robot 10.

The calculation information storage module 440 stores each information calculated by the external information calculation module 350. The calculation information storage module 440 is electrically connected to the external information calculation module 350.

Each calculated information stored in the operation information storage module 440 may be mapped to a control signal, operation information, and detection information, respectively. The calculation information storage module 440 is electrically connected to the control signal storage module 410, the operation information storage module 420, and the detection information storage module 430.

Therefore, the information calculated according to the specific control signal, operation information and detection information can be databased.

As a result, when an unpredictable situation occurs while the lawn mower robot 10 is operating, immediate response to the situation can be made by utilizing each information stored in the calculation information storage module 440 without repetitive calculation. Accordingly, the operation efficiency of the lawn mower robot 10 can be improved.

As described above, the external information calculation module 350 calculates adjacent direction information and deviation information. Accordingly, the calculation information storage module 440 includes an adjacent direction information storage unit 441 and a deviation information storage unit 442.

The adjacent direction information calculation unit 441 stores transferred adjacent direction information. The deviation information storage unit 442 stores transferred deviation information. The adjacent direction information storage unit 441 and the deviation information storage unit 442 are electrically connected to each other.

The detection process of the sensor part 200, the information processing and calculation process of the controller 300, and the storing process of the database part 400 may be performed in real time. In addition, each of the processes may be performed continuously.

3. Description of Method for Controlling Lawn Mower Robot 10 According to Embodiment In a method for controlling a lawn mower robot 10 according to an embodiment disclosed herein, when the lawn mower robot 10 collides with an obstacle during an operation, the lawn mower robot 10 may be controlled to return to an original position.

The control may be achieved by the aforementioned configurations without a control signal separately input by the user.

Hereinafter, a method for controlling a lawn mower robot according to an embodiment will be described in detail with reference to FIGS. 4 to 9.

The term "preset region B" used in the following description refers to a specific small area or region, in which the lawn mower robot 10 is performing a work according to an input control signal, among a plurality of small regions.

(1) Description of Step (S100) in Which the Distance Sensor Module 220 Detects Spaced Distance Information from Wire W Arranged to Surround Preset Region B This is a step in which the sensor part 200 detects information on an external environment of the lawn mower robot 10 and information on an operating state of the lawn mower robot 10. Hereinafter, this step will be described in detail with reference to FIG. 5.

First, the first distance sensor unit 221 detects first spaced distance information D1 which is spaced distance information in a preset first direction (S110).

In one embodiment, as described above, the first direction may be a right direction of the lawn mower robot 10.

In addition, the second distance sensor unit 222 detects second spaced distance information D2 which is spaced distance information in a preset second direction opposite to the first direction (S120).

In one embodiment, as described above, the second direction may be a left direction of the lawn mower robot 10.

Although not shown, the third distance sensor unit 223 may also detect third spaced distance information D3 which is spaced distance information in a preset third direction.

In one embodiment, as described above, the third direction may be between the first direction and the second direction, that is, the front of the lawn mower robot 10.

The first to third spaced distance information D1, D2, and D3 detected by the distance sensor units 221, 222, and 223 are transmitted to the distance information reception unit 342 of the detection information reception module 340.

(2) Description of Step (S200) in Which the External Information Calculation Module 350 Calculates Adjacent Direction Information Using Detected Spaced Distance Information The controller 300 receives each detected spaced distance information D1, D2, and D3, and calculates adjacent direction information by using the received spaced distance information D1, D2, and D3. Hereinafter, this step will be described in detail with reference to FIG. 6.

In the following description, it is assumed that the lawn mower robot 10 has been deviated from a preset course due to collision with an obstacle during an operation.

That is, the assumption may include not only a situation in which the lawn mower robot 10 has been deviated from a preset region B but also a situation in which the lawn mower robot 10 is located in the preset region B but has been deviated only from a preset course.

First, the position sensor module 230 detects position information related to the lawn mower robot 10 (S210).

The position sensor module 230 may detect position information related to the body part 100 of the lawn mower robot 10. This results from that the body part 100 defines the outside of the lawn mower robot 10.

The position information detected by the position sensor module 230 is transmitted to the position information reception unit 343 of the detection information reception module 340. The transferred position information is then transferred to the deviation information calculation unit 352 of the external information calculation module 350.

The deviation information calculation unit 352 calculates information on a percentage of a volume at which the body part 100 of the lawn mower robot 10 has been deviated from the preset region B, that is, deviation information, using the detected position information (S220).

In one embodiment, the deviation information may be calculated as a percentage of a volume of the body part 100 of the lawn mower robot 10, which is not located in the preset region B, with respect to an entire volume of the body part 100.

Also, the deviation information calculation unit 352 compares the calculated deviation information with a preset percentage value.

The preset percentage value may be determined as a maximum value by which it can be determined that the lawn mower robot 10 has not been completely deviated from the preset region B. That is, the preset percentage value may be defined as a reference value by which the lawn mower robot 10 can return to the preset region B only by reversing or the like.

In one embodiment, the preset percentage value may be determined as 50%.

When the calculated deviation information exceeds a preset percentage value according to the comparison result, it may be determined that the lawn mower robot 10 has been deviated from the preset region B due to collision with an obstacle or the like. It may also be determined that the lawn mower robot 10 cannot return to the preset region B only by a simple operation such as reversing.

In this case, the adjacent direction information calculation unit 351 calculates adjacent direction information by using a difference between the detected first spaced distance information D1 and the detected second spaced distance information D2 (S230).

The adjacent direction information calculation unit 351 may calculate adjacent direction information even by using the third spaced distance information D3.

That is, the adjacent direction information calculation unit 351 calculates the differences among the first to third spaced distance information D1, D2, and D3, respectively. As a result of the calculation, spaced distance information having the smallest value may be calculated as adjacent direction information.

For example, when a value obtained by subtracting the second spaced distance information D2 from the first spaced distance information D1 is a negative value, the first spaced distance information D1 may be calculated as adjacent direction information.

Alternatively, as described above, the adjacent direction information may be calculated using the magnitudes among the first to third spaced distance information D1, D2, and D3.

That is, this is a step of determining a direction in which the lawn mower robot 10, which has been deviated from the preset region B, can return to the preset region B at the shortest distance. In this step, the adjacent direction information may be calculated as one of the first direction, the second direction, and the third direction.

Alternatively, the adjacent direction information may be computed as any direction between the first and second directions or between the second and third directions.

The adjacent direction information calculated by the adjacent direction information calculation unit 351 is transmitted to the operation information calculation module 320.

(3) Description of Step (S300) in Which the Operation Information Calculation Module 320 Calculates Operation Information Using Calculated Adjacent Direction Information The operation information calculation module 320 calculates operation information using the adjacent direction information calculated by the adjacent direction information calculation unit 351. Hereinafter, this step will be described in detail with reference to FIG. 7.

In this step, it is assumed that the lawn mower robot 10 has been excessively deviated from the preset region B because deviation information calculated by the deviation information calculation unit 352 exceeds a preset percentage value.

The operation information calculation module 320 receives the adjacent direction information. As described above, the adjacent direction information may be any one of the first direction, the second direction, and the third direction.

The operation information calculation module 320 receives past operation information from the operation information storage module 420 of the database part 400.

The past operation information may be operation information immediately before the calculated deviation information exceeds the preset percentage value, that is, a moment when the calculated deviation information is the same as the preset percentage value.

Based on the received adjacent direction information and past operation information, the operation information calculation module 320 calculates operation information. That is, the driving information calculation unit 321 calculates driving information, and the steering information calculation unit 322 calculates steering information.

Specifically, the operation information calculation module 320 calculates driving information for rotating the power module 130 in a direction opposite to a rotational direction, which is a direction immediately before the calculated deviation information exceeds the preset percentage value, of a first rotational direction and a second rotational direction (S310).

That is, when the immediately preceding rotational direction is the first rotational direction, the driving information may be calculated as the second rotational direction. On the other hand, when the immediately preceding rotational direction is the second rotational direction, the driving information may be calculated as the first rotational direction.

This is to make the lawn mower robot 10 move rearward when it collides with an obstacle while moving forward. Similarly, this is to make the lawn mower robot 10 move forward when the lawn mower robot 10 collides with an obstacle while moving rearward.

Accordingly, an additional collision between the lawn mower robot 10 and an obstacle or the like can be prevented. In addition, the lawn mower robot 10 may return to the preset region B along a path on which it has been deviated from the preset region B.

In addition, the operation information calculation module 320 calculates steering information for the lawn mower robot 10 to return to the preset region B along the shortest path.

That is, when the calculated adjacent direction information is the first direction, the operation information calculation module 320 may include calculate steering information for controlling the power module 130 such that a rotational speed of the second power module 132 is faster than that of the first power module 131 (S320).

In other words, the steering information is calculated such that the second steering information has a larger value than the first steering information.

On the contrary, when the calculated adjacent direction information is the second direction, the operation information calculation module 320 may calculate steering information for controlling the power module 130 such that the rotational speed of the first power module 131 is faster than that of the second power module 132 (S330).

In other words, the steering information is calculated such that the first steering information has a larger value than the second steering information.

This considers the position of the distance sensor module 220 provided on the front side of the housing 110.

That is, when the calculated adjacent direction information is the first direction, it may be determined that a distance between the second main wheel 121*b* and the wire W is longer than a distance between the first main wheel 121*a* and the wire W.

Therefore, when the second main wheel 121*b* is rotated faster than the first main wheel 121*a*, the second main wheel 121*b* draws a curve having a larger radius than the first main wheel 121*a*. Accordingly, the lawn mower robot 10 may return to the preset region B by traveling the shortest distance.

In addition, when the calculated adjacent direction information is the second direction, it may be determined that the distance between the first main wheel 121*a* and the wire W is longer than the distance between the second main wheel 121*b* and the wire W.

Therefore, when the first main wheel 121*a* is rotated faster than the second main wheel 121*b*, the first main wheel 121*a* draws a curve having a larger radius than the second main wheel 121*b*. Accordingly, the lawn mower robot 10 may return to the preset region B by traveling the shortest distance.

The driving information and the steering information calculated by the operation information calculation module 320 are transmitted to the operation control module 330.

(4) Description of Step (S400) in Which the Power Module 130 is Controlled According to Calculated Operation Information This is a step in which the operation control module 330 calculates operation control information according to the operation information, namely, the driving information and the steering information, calculated by the operation information calculation module 320, and the power module 130 is controlled according to the calculated operation control information. Hereinafter, this step will be described in detail with reference to FIG. 8.

The operation control module 330 receives the calculated driving information and steering information. In detail, the power module control unit 331 calculates operation control information for controlling the power module 130 by receiving the calculated driving information and steering information.

The operation control module 330 rotates the power module 130 according to the calculated steering information (S410).

In addition, the operation control module 330 rotates the power module 130 according to the calculated driving information (S420).

In the illustrated embodiment, the power module 130 is controlled based on operation control information according to steering information, and then controlled based on operation control information according to driving information. This is to control the lawn mower robot 10 to be moved after a moving direction of the lawn mower robot 10 is decided.

The order of the control may change.

That is, the lawn mower robot 10 may be controlled by the operation control information according to the steering information and then controlled by the operation control information according to the driving information. Furthermore, the lawn mower robot 10 may be controlled simultaneously by each operation control information according to the driving information and the steering information.

(5) Description of Step (S500) in Which the Power Module 130 Operates in Preset Region B This is a step in which the lawn mower robot 10 returns to the preset region B and then operates in the preset region B in a preset manner, namely, according to a pre-input control signal. Hereinafter, this step will be described in detail with reference to FIG. 9.

The position sensor module 230 detects position information related to the lawn mower robot 10 (S510). In one embodiment, the position sensor module 230 may detect the position of the body part 100.

The position information detected by the position sensor module 230 is transmitted to the deviation information calculation unit 352.

The deviation information calculation unit 352 calculates deviation information on a percentage of a volume of the body part 100 of the lawn mower robot 10, which has been deviated from the preset region B, by using the detected position information (S520).

Also, the deviation information calculation unit 352 compares the calculated deviation information with a preset percentage value. The step is performed to determine whether the lawn mower robot 10 is located in the preset region B.

According to a result of the comparison, a case where the calculated deviation information exceeds the preset percentage value may be predicted. In this case, it may be determined that the lawn mower robot 10 has not sufficiently returned to the preset region B. Therefore, the steps S100 to S400 may be repeatedly performed.

According to the result of the comparison, another case where the calculated deviation information is equal to or lower than the preset percentage value may be predicted. In this case, it may be determined that the lawn mower robot 10 has sufficiently returned to the preset region B. Therefore, the lawn mower robot 10 is controlled to operate according to a pre-input control signal.

Hereinafter, description will be given of a step performed under assumption that the lawn mower robot 10 has sufficiently returned to the preset region B, that is, the calculated deviation information is equal to or lower than the preset percentage value.

The steering information calculation unit 322 of the operation information calculation module 320 calculates steering information in a preset manner (S530).

The preset manner may be steering information calculated according to a control signal previously input through the control signal input module 310.

In addition, the driving information calculation unit 321 of the operation information calculation module 320 calculates driving information in a preset manner (S540).

The preset manner may be driving information calculated according to a control signal previously input through the control signal input module 310.

The calculated steering information and driving information are transmitted to the power module control unit 331.

The power module control unit 311 controls the power module 130 to operate, namely, rotate according to the calculated steering information and driving information (S550).

That is, the lawn mower robot 10 restarts a work according to operation information which is calculated according to the pre-input control signal.

Accordingly, the lawn mower robot 10 which has returned from an unpredicted situation can perform a task corresponding to the pre-input control signal. Therefore, a situation in which a work in progress is stopped due to an occurrence of such an unpredicted situation can be prevented.

4. Description of Operating Process of Lawn Mower Robot 10 According to Embodiment Hereinafter, description will be given in detail of a process in which the lawn mower robot 10 is controlled to perform a task according to the respective components of the lawn mower robot 10 and the control method of the lawn mower robot 10, with reference to FIGS. 10 to 14.

Figure 10:
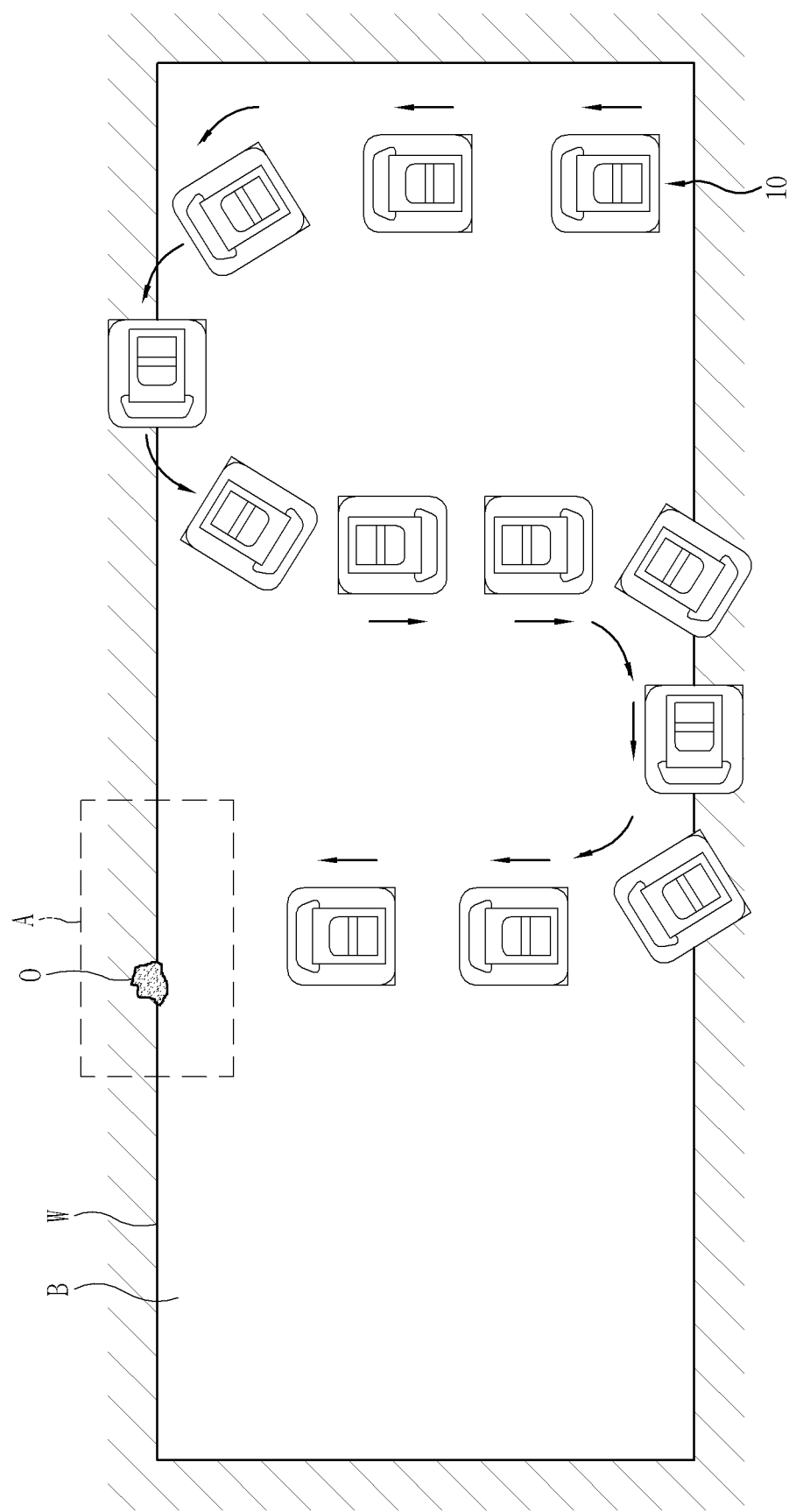
FIG. 10 is a conceptual view illustrating an exemplary traveling process of the lawn mower robot of FIG. 1.

Referring to FIG. 10, the lawn mower robot 10 performs a work in a preset region. The preset region B is partitioned by the wire W and surrounded by the wire W.

In the illustrated embodiment, the lawn mower robot 10 moves upward. When the lawn mower robot 10 is located adjacent to the upper wire W, the lawn mower robot 10 is rotated counterclockwise to move to the left along the wire W.

This is to prevent a situation in which a task is not performed on a boundary of the partitioned small region.

The lawn mower robot 10 is then rotated counterclockwise again and moves downward. When the lawn mower robot 10 is located adjacent to the lower wire W, the lawn mower robot 10 is rotated clockwise to move to the left along the wire W.

That is, the lawn mower robot 10 moves along a zigzag path by repeatedly moving up and down in the preset region B.

In the illustrated embodiment, a path along which the lawn mower robot 10 moves upward and a path along which the lawn mower robot 10 moves downward are slightly spaced apart from each other. This is for convenience of understanding, and it will be understood that the path for the upward movement and the path for the downward movement are adjacent to each other in an actual case.

The lawn mower robot 10 which is moving upward again approaches a region A where an obstacle O is located.

Figure 11:
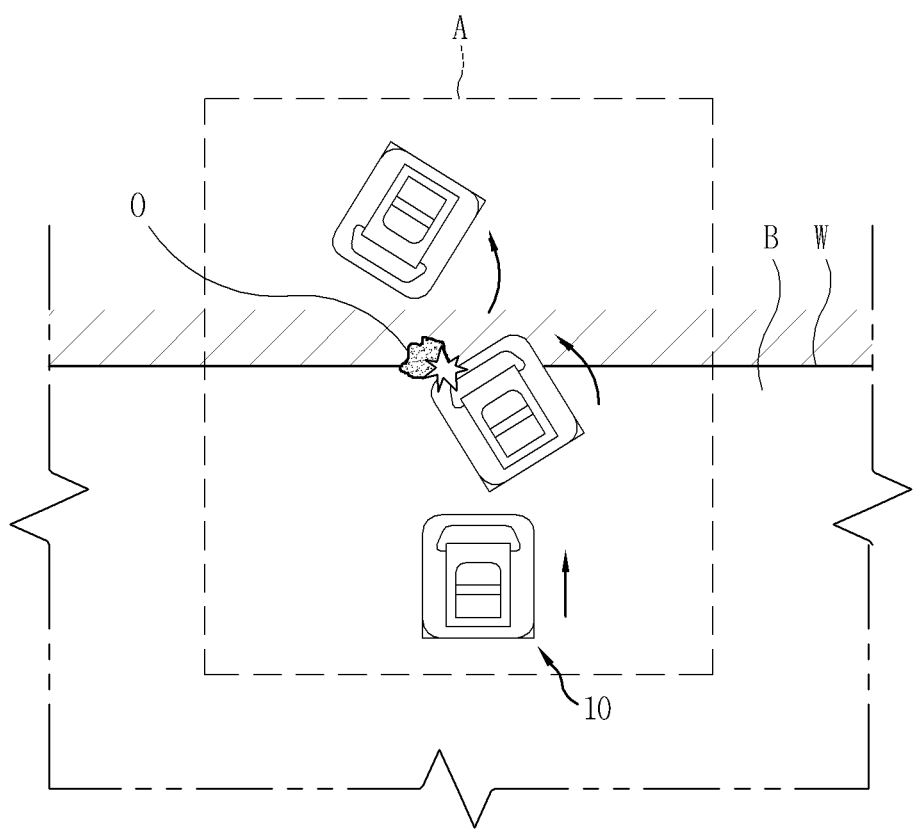
FIG. 11 is a conceptual view illustrating an exemplary traveling process of the lawn mower robot of FIG. 1.

Referring to FIG. 11, the lawn mower robot 10 which is moving upward collides with the obstacle O. Due to the collision, the lawn mower robot 10 may be deviated from the preset region B and thereby enter another small region.

Figure 12:
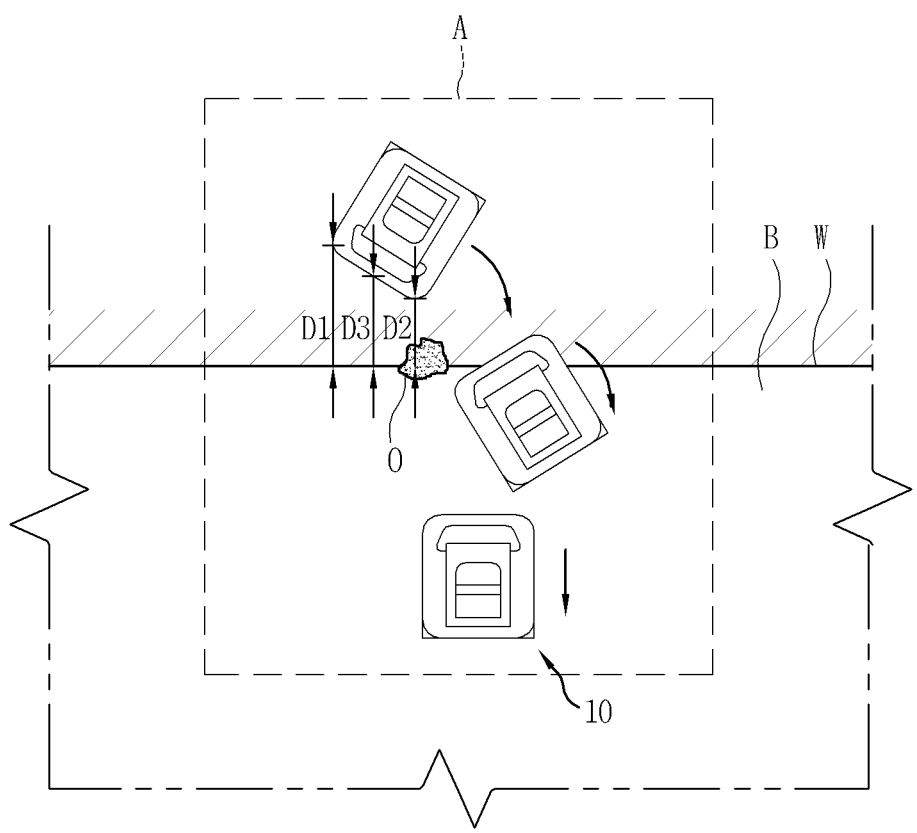
FIG. 12 FIG. 13 are conceptual views illustrating an exemplary traveling process of the lawn mower robot of FIG. 1.
Figure 13:
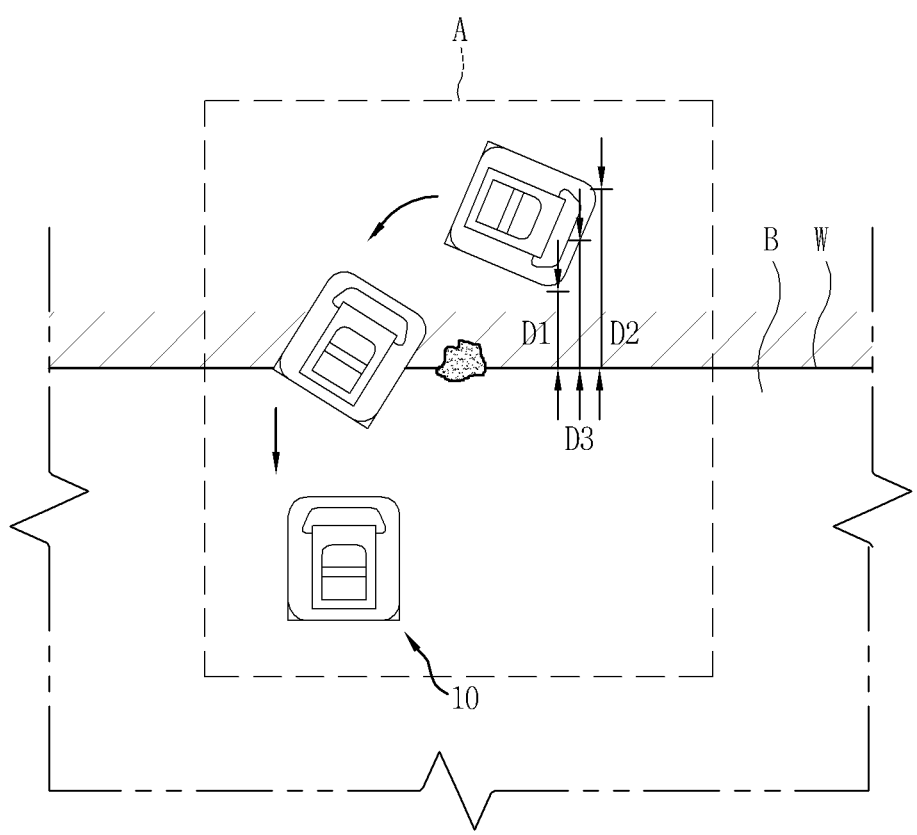

Referring to FIGS. 12 and 13, a process in which the lawn mower robot 10 which has entered another small region returns to the preset region B is illustrated.

Each distance sensor unit 221, 222, 223 detects spaced distance information D1, D2, and D3 between the lawn mower robot 10 and the wire W. The sensed spaced distance information D1, D2, and D3 are transmitted to the adjacent direction information calculation unit 351 of the controller 300.

The position sensor module 230 detects position information related to the lawn mower robot 10. The detected position information is transmitted to the deviation information calculation unit 352.

The deviation information calculation unit 352 calculates deviation information using the transmitted position information and position information related to the preset region B.

In the embodiment illustrated in FIGS. 12 and 13, the lawn mower robot 10 is completely deviated out of the preset region B. Therefore, the calculated deviation information may be calculated as 100%.

Also, the deviation information calculation unit 352 compares the calculated deviation information with a preset percentage value. In one embodiment, the preset percentage value may be determined as 50%. Therefore, the calculated deviation information exceeds the preset percentage value.

Thus, the adjacent direction information calculation unit 351 calculates adjacent direction information. The calculation may be performed based on the spaced distance information D1, D2, and D3 detected by each of the first to third distance sensor units 221, 222, and 223.

In the embodiment illustrated in FIG. 12, the first spaced distance information D1 is the longest and the second spaced distance information D2 is the shortest. Therefore, the adjacent direction information calculation unit 351 calculates the adjacent direction information according to the second spaced distance information D2. That is, the adjacent direction information is calculated as the second direction.

In addition, in the embodiment illustrated in FIG. 13, the second spaced distance information D2 is the longest, and the first spaced distance information D1 is the shortest. Therefore, the adjacent direction information calculation unit 351 calculates the adjacent direction information according to the first spaced distance information D1. That is, the adjacent direction information is calculated as the first direction.

The adjacent direction information calculated by the adjacent direction information calculation unit 351 is transmitted to the operation information calculation module 320. The operation information calculation module 320 calculates operation information according to the transmitted adjacent direction information.

In the embodiment illustrated in FIGS. 12 and 13, the lawn mower robot 10 proceeds upward, namely, to the front thereof immediately before the collision with the obstacle O.

That is, if a first rotational direction is defined as a direction for allowing the lawn mower robot 10 to move forward, it may be said that the power module 130 was being rotated in the first rotational direction. The information may be transferred by the operation information storage module 420 of the database unit 400.

Accordingly, the driving information calculation unit 321 calculates driving information for rotating the first power module 131 and the second power module 132 in a rotational direction opposite to the first rotational direction, namely, the second direction.

According to the driving information, each of the power modules 131 and 132 may be rotated in the second direction so that the lawn mower robot 10 can move toward the rear side.

In addition, in the embodiment illustrated in FIG. 12, the adjacent direction information is calculated as the second direction.

Accordingly, the steering information calculation unit 322 calculates steering information for controlling the lawn mower robot 10 such that a rotational speed of the first main wheel 121a located at the right side of the lawn mower robot 10 is faster than that of the second main wheel 121b located at the left side of the lawn mower robot 10.

Therefore, since the first main wheel 121a is rotated more for the same time, the lawn mower robot 10 can be rotated clockwise and reversed.

In contrast, in the embodiment illustrated in FIG. 13, the adjacent direction information is calculated as the first direction.

Accordingly, the steering information calculation unit 322 calculates steering information for controlling the lawn mower robot 10 such that the rotational speed of the second main wheel 121*b* located at the left side of the lawn mower robot 10 is faster than that of the first main wheel 121*a* located at the right side of the lawn mower robot 10.

Therefore, since the second main wheel 121*b* is rotated more for the same time, the lawn mower robot 10 can be rotated counterclockwise and reversed.

Referring to FIG. 14, a situation in which the lawn mower robot 10 returns to the inside of the preset region B through the aforementioned processes is illustrated.

The position sensor module 230 detects position information related to the lawn mower robot 10. The detected position information is transmitted to the deviation information calculation unit 352.

The deviation information calculation unit 352 calculates deviation information using the transmitted position information and the position information related to the preset region B.

In the embodiment illustrated in FIG. 14, the lawn mower robot 10 is located inside the preset region B. Therefore, the calculated deviation information may be calculated as 0%.

Also, the deviation information calculation unit 352 compares the calculated deviation information with a preset percentage value. In one embodiment, the preset percentage value may be determined as 50%. Therefore, the calculated deviation information is equal to or lower than the preset percentage value.

Thus, the operation information calculation module 320 calculates operation information according to a control signal previously input through the control signal input module 310. The calculated operation information is operation information according to the pre-input control signal, namely, operation information for performing a task, which the user wanted to perform before the occurrence of the collision.

Therefore, the lawn mower robot 10, as described above, restarts the operation by moving up and down in the preset region B along a zigzag path. At this time, the lawn mower robot 10 has already been aware of the presence of the obstacle O. Therefore, the lawn mower robot 10 does not proceed to the upper wire W in order to avoid the repeated collision with the obstacle O.

That is, the lawn mower robot 10 may be moved to the left by being rotated counterclockwise at a distance that the robot may not be in contact with the obstacle O, and then perform a task by repeatedly moving up and down along the preset zigzag path.

The foregoing description has been given of the preferred embodiments, but it will be apparent to those skilled in the art that various modifications and variations can be made in the present disclosure without departing from the scope of the disclosure as defined in the appended claims.

What is claimed is:

1. A lawn mower robot comprising:
a body part;
a plurality of main wheels rotatably connected to the body part;
a respective power module connected to each of the respective main wheels, each respective power module being configured to be rotated based on driving information so as to rotate the main wheels;
a controller electrically connected to each respective power module, the controller being configured to calculate the driving information and transfer the calculated driving information to each respective power module; and
a sensor part electrically connected to the controller, the sensor part being configured to detect spaced distance information for a distance from the body part to a wire disposed to surround a preset region within which the lawn mower robot is operating, and transfer the detected spaced distance information to the controller,
wherein the controller calculates the driving information based on the spaced distance information detected by the sensor part,
wherein the spaced distance information comprises:
first spaced distance information for a distance taken in a preset first direction; and
second spaced distance information for a distance taken in a preset second direction different from the first direction,
wherein the sensor part comprises:
a first distance sensor unit configured to detect the first spaced distance information; and
a second distance sensor unit configured to detect the second spaced distance information, and
wherein the controller is further configured to:
calculate adjacent direction information based on a difference between the first spaced distance information and the second spaced distance information, and
calculate deviation information related to a percentage of a volume of the body part deviated from the preset region, and calculate the adjacent direction information when the calculated deviation information exceeds a preset percentage value.

2. The lawn mower robot of claim 1, wherein, the spaced distance information further comprises third spaced distance information for a distance taken in a preset third direction, with the preset third direction being positioned in between the first direction and the second direction, and
the sensor part further comprising a third distance sensor unit configured to detect the third spaced distance information.

3. The lawn mower robot of claim 1, wherein, each of the respective power modules is configured to be rotated in one of a preset first rotational direction or a preset second rotational direction opposite to the first rotational direction, and the controller is further configured such that, when the calculated deviation information exceeds the preset percentage value, the controller is configured to calculate the driving information for rotating a respective power module in one of the first rotational direction or the second rotational direction, opposite to a rotational direction of the respective power module immediately before the calculated deviation information exceeds the preset percentage value.

4. The lawn mower robot of claim 3, wherein the plurality of main wheels comprises:
a first main wheel located at one side of the body part facing the first direction; and
a second main wheel located at another side of the body part facing the second direction,
the respective power modules comprise:
a first power module connected to the first main wheel; and a second power module connected to the second main wheel, and
the controller is configured to:
calculate steering information for controlling each of the respective power modules such that a rotational speed of the second power module is faster than a rotational speed of the first power module when the calculated adjacent direction information is the first direction, and calculate steering information for controlling each of the respective power modules such that a rotational speed of the first power module is faster than a rotational speed of the second power module when the calculated adjacent direction information is the second direction.

5. A method for controlling a lawn mower robot, the method comprising:
(a) detecting, by a distance sensor module, spaced distance information for a distance from the lawn mower robot to a wire disposed to surround a preset region within which the lawn mower robot is operating;
(b) calculating, by an external information calculation module, adjacent direction information based on the detected spaced distance information;
(c) calculating, by an operation information calculation module, operation information based on the calculated adjacent direction information; and
(d) controlling a power module connected to wheels of the lawn mower robot based on the calculated operation information,
wherein the step (a) comprises:
(a1) detecting, by a first distance sensor unit, first spaced distance information for a distance taken in a preset first direction; and
(a2) detecting, by a second distance sensor unit, second spaced distance information for a distance taken in a preset second direction different from the first direction, and
wherein the step (b) comprises:
(b1) detecting, by a position sensor module, position information related to a body part of the lawn mower robot;
(b2) calculating, by a deviation information calculation unit, deviation information related to a percentage of a volume of the body part deviated from the preset region; and
(b3) calculating, by an adjacent direction information calculation unit, the adjacent direction information based on a difference between the detected first spaced distance information and the detected second spaced distance information when the deviation information exceeds a preset percentage value.

6. The method of claim 5, wherein, the operation information comprises driving information for driving the power module, the power module is configured to be rotated in one of a preset first rotational direction or a preset second rotational direction opposite to the first rotational direction, and the step (c) comprises (c1) calculating, by the operation information calculation module, driving information for rotating the power module in one of the first rotational direction or the second rotational direction, opposite to a rotational direction of the power module immediately before the calculated deviation information exceeds the preset percentage value, when the calculated deviation information exceeds the preset percentage value.

7. The method of claim 6, wherein the power module comprises:
a first power module connected to a first wheel of the lawn mower robot facing in the first direction; and a second power module connected to a second wheel of the lawn mower robot facing in the second direction, the operation information comprises steering information for controlling rotations of the first power module and the second power module, respectively, the step (c) comprises:
(c2) calculating, by the operation information calculation module, steering information for controlling the power module such that a rotational speed of the second power module is faster than a rotational speed of the first power module, when the calculated deviation information exceeds the preset percentage value and the calculated adjacent direction information is the first direction; and
(c3) calculating, by the operation information calculation module, steering information for controlling the power module such that a rotational speed of the first power module is faster than a rotational speed of the second power module, when the calculated deviation information exceeds the preset percentage value and the calculated adjacent direction information is the second direction.

8. The method of claim 7, wherein the step (d) comprises:
(d1) rotating the power module according to the calculated steering information; and
(d2) the power module according to the calculated driving information.

9. The method of claim 8, further comprising after the step (d): (e) operating the power module in the preset region.

10. The method of claim 9, wherein the step (e) comprises: (e1) detecting, by the position sensor module, position information related to the body part;
(e2) calculating, by the deviation information calculation unit, deviation information related to a percentage of a volume of the body part deviated from the preset region, based on the detected position information;
(e3) calculating, by the operation information calculation module, steering information in a preset manner when the calculated deviation information is equal to or lower than the preset percentage value; and
(e4) calculating, by the operation information calculation module, driving information in a preset manner when the calculated deviation information is equal to or lower than the preset percentage value.

11. The method of claim 10, wherein the step (e) comprises after the step (e4): (e5) controlling, by a power module control unit, the power module to rotate according to the calculated steering information and the calculated driving information.

* * * * *